United States Patent
Kim et al.

(10) Patent No.: US 10,133,711 B2
(45) Date of Patent: Nov. 20, 2018

(54) DISPLAY APPARATUS AND CONTROL METHOD THEREOF

(71) Applicant: SAMSUNG ELECTRONICS CO., LTD., Suwon-si, Gyeonggi-do (KR)

(72) Inventors: Chang Yeon Kim, Suwon-si (KR); Jae Young Myo, Suwon-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/091,636

(22) Filed: Apr. 6, 2016

(65) Prior Publication Data

US 2016/0300381 A1     Oct. 13, 2016

(30) Foreign Application Priority Data

Apr. 7, 2015    (KR) .................. 10-2015-0049240

(51) Int. Cl.

| | |
|---|---|
| *G06T 15/00* | (2011.01) |
| *G06F 17/27* | (2006.01) |
| *G06F 17/22* | (2006.01) |
| *G06T 1/60* | (2006.01) |
| *G06F 17/21* | (2006.01) |
| *G06T 15/40* | (2011.01) |
| *G06T 15/50* | (2011.01) |

(52) U.S. Cl.
CPC ........ *G06F 17/2247* (2013.01); *G06F 17/211* (2013.01); *G06F 17/2229* (2013.01); *G06T 1/60* (2013.01); *G06T 15/40* (2013.01); *G06T 15/503* (2013.01); *G06T 2210/08* (2013.01)

(58) Field of Classification Search
CPC .... G06F 3/14; G06F 17/2205; G06F 17/2229; G06F 17/2247; G06F 2203/04806; G06F 3/0485; G06F 9/4443; G06T 15/005; G06T 15/08; G06T 15/405; G06T 17/05; G06T 1/0007; G06T 1/20; G06T 2200/24; G06T 2210/36; G06T 3/0012
See application file for complete search history.

(56) References Cited

U.S. PATENT DOCUMENTS

| | | | | |
|---|---|---|---|---|
| 6,268,859 | B1 * | 7/2001 | Andresen | G06T 15/40 345/421 |
| 7,777,750 | B1 * | 8/2010 | Brown | G06T 15/04 345/522 |
| 8,189,009 | B1 * | 5/2012 | Brown | G06T 15/04 345/426 |
| 8,411,113 | B1 * | 4/2013 | Cornell | G06T 15/405 345/421 |
| 2002/0130870 | A1 * | 9/2002 | Ebihara | G06T 1/0007 345/440 |
| 2006/0109268 | A1 * | 5/2006 | Napoli | G06T 15/08 345/424 |

(Continued)

*Primary Examiner* — Sultana M Zalalee
(74) *Attorney, Agent, or Firm* — Nixon & Vanderhye, P.C.

(57) ABSTRACT

A display apparatus is disclosed, the display apparatus including: communication circuitry configured to receive a web-based content comprising a plurality of objects; a display configured to display an image; a memory configured to be loaded with data of the image displayed on the display; and at least one processor configured to load data of a first object in the memory and to not load data of a second object in the memory if an area of the first object is displayed to cover areas of one or more second objects of the plurality of objects of the web-based contents.

16 Claims, 25 Drawing Sheets

(56) References Cited

U.S. PATENT DOCUMENTS

| | | | | |
|---|---|---|---|---|
| 2008/0120626 A1* | 5/2008 | Graffagnino | G06F 17/2205 | 719/320 |
| 2008/0246773 A1* | 10/2008 | Jiao | G06T 15/00 | 345/522 |
| 2010/0026682 A1* | 2/2010 | Plowman | G06T 15/40 | 345/419 |
| 2012/0159402 A1* | 6/2012 | Nurmi | G06F 3/04883 | 715/863 |
| 2012/0293545 A1* | 11/2012 | Engh-Halstvedt | G06T 15/40 | 345/629 |
| 2013/0176320 A1 | 7/2013 | Bourges-Sevenier | | |
| 2014/0089893 A1* | 3/2014 | Bromley, Jr. | G06F 8/30 | 717/107 |
| 2014/0240315 A1* | 8/2014 | Wong | G06T 19/20 | 345/424 |
| 2015/0123993 A1* | 5/2015 | Ohba | G09G 5/00 | 345/629 |
| 2016/0225122 A1* | 8/2016 | Boelter | H04N 21/42201 | |

* cited by examiner

FIG. 8

```
< html >
< head >
    < title > test < /title >
< /head >
< body >
    < h1 > example < /h1 >
    < form > sample < /form >
< /body >
< /html >
```

DISPLAY APPARATUS AND CONTROL METHOD THEREOF

CROSS-REFERENCE TO RELATED APPLICATION

This application is based on and claims priority under 35 U.S.C. § 119 to Korean Patent Application No. 10-2015-0049240 filed on Apr. 7, 2015 in the Korean Intellectual Property Office, the disclosure of which is incorporated by reference herein in its entirety.

BACKGROUND

Field

Apparatuses and methods of the disclosure relate generally to a display apparatus with a web platform capable of accessing Internet to display an image such as a web page or the like or execute a web application and a control method thereof, and for example, to a display apparatus and a control method thereof, which can reduce a load of a system for processing a certain graphic element when the corresponding graphic element is executed and displayed on a web platform.

Description of Related Art

An image processing apparatus processes an image signal/video data received from the exterior in accordance with various video processing processes. The image processing apparatus may display an image based on the processed video data on its own display panel, or output the processed image signal to another display apparatus provided with a panel so that on the corresponding display apparatus can display an image based on the processed image signal. That is, the image processing apparatus may include the panel capable of displaying an image or include no panel as long as it can process the video data. For example, the former may include a television (TV) and a portable multimedia player, and the latter may include a set-top box.

To meet various demands of a user, the image processing apparatus, in particular, a display apparatus has been developed to support not only a function of simply displaying an image of contents but also more advanced deeper and extended functions. For example, the display apparatus can access Internet to display a web page or execute a web-based application. Like an image of a general content such as broadcasting data content or local contents, the display apparatus parses and process data of a web page through a central processing unit (CPU) and a graphics processing unit (GPU), thereby displaying an image of the web page.

However, graphic elements included in the web page or the web application involves a graphic object requiring a high-degree calculation process as well as a simple image. For example, there is a 3D graphic object generally applied to a game or the like. Process of such a graphic object is heavy on the CPU and GPU, and particularly on the GPU, and therefore the performance of the display apparatus having a limited system resource may be lowered when the graphic object is processed.

Therefore, when the web-based application including the graphic object requiring the high-degree calculation process is executed, there is a need of design or a method to reduce the calculation load of the CPU or GPU so that the display apparatus can efficiently execute the corresponding application.

SUMMARY

According to an aspect of an example embodiment, a display apparatus is provided, comprising: communication circuitry configured to receive a web-based content comprising a plurality of objects; a display configured to display an image; a memory configured to be loaded with data of the image displayed on the display; and at least one processor configured to load data of a first object in the memory and to prevent data of a second object from being loaded in the memory if an area of the first object is displayed to cover areas of one or more second objects among the plurality of objects of the web-based contents. Since the second objects covered with the first object and thus not shown in the screen are not loaded to the memory, it is possible to minimize and/or reduce wasteful operations. Further, the load of the display apparatus is reduced, thereby securing the speed of executing the first object.

The at least one processor may be configured to determine whether the first object is subject to a 3D graphic process in response to an instruction for covering the areas of one or more second objects with the area of the first object, and to process the first object to be resized and displayed based on the instruction if it is determined that the first object is subject to the 3D graphic process. Thus, if the first object is subject to the 3D graphic process requiring a high-degree calculation process, the speed of executing the first object is maintained and/or not substantially degraded.

The at least one processor may be configured to determine that the first object is subject to the 3D graphic process if the first object is processed by calling out a preset application programming interface (API) when the first object is loaded to the memory. For example, the preset API may comprise a web graphic library (WebGL). Thus, it is can be determined whether the first object is subject to a relatively high-degree calculation process.

Further, the at least one processor comprises: a central processing unit (CPU) configured to extract the plurality of objects from the web-based contents; and a graphic processing unit (GPU) configured to process an object subject to a 3D graphic process among the plurality of objects extracted by the CPU. For example, the CPU transfers only the first object and not the one or more second objects among the plurality of extracted objects to the GPU in response to the instruction. For example, the GPU may load the memory with textures obtained by rendering the object transferred from the CPU, compose a plurality of textures if the plurality of textures are loaded to the memory, and process one texture as the image without the composition if one texture is loaded to the memory. Thus, it is possible to reduce wasteful operations while the CPU extracts the objects and the GPU renders the object, thereby reducing the calculation load of the CPU and GPU.

Further, the at least one processor may be configured to load the memory with the plurality of objects so that the image can be displayed including the plurality of objects, if an instruction is given for displaying the image of the web-based content. Thus, if one object is not displayed as the full screen, the plurality of objects can appear in the image.

Further, determining whether the area of the first object is displayed to cover the areas of the one or more second objects may comprise that the first object is displayed on a whole display area preset to display the image of the web-based content in the display. That is, the present aspect is applied when a user instructs the first object to be displayed as a full screen in the display or the web view of the web browser.

The display apparatus may further comprise a plurality of buffers to which the plurality of objects are respectively loaded at rendering, and the at least one processor may be configured render only the object loaded to the buffer using the WebGL among the plurality of buffers. Thus, it is possible to remove the operations of synchronizing and synthesizing the object using the WebGL with other objects that do not use the WebGL.

According to an aspect of an example embodiment, a display apparatus is provided, comprising: communication circuitry configured to receive a web content comprising a plurality of graphic layers; a display configured to display an image; a memory configured to be loaded with the graphic layers so that an image of the web content can be displayed in the display; and at least one processor configured to extract the plurality of graphic layers from the web content received by the communication circuitry, and load the extracted graphic layers to the memory so that an image of the web-based content can be displayed in the display, wherein the at least one processor is configured to resize a graphic layer among the plurality of graphic layers of the web content in response to an instruction for resizing the graphic layer, and to prevent one or more graphic layers overlapping the resized graphic layer among the plurality of graphic layer from being loaded to the memory. Since the other layers covered with a certain layer and thus not shown or displayed on the screen are not loaded to the memory, it is possible to minimize and/or reduce wasteful operations. Further, the load of the display apparatus is reduced, thereby securing the display speed of an image.

The at least one processor may be configured to select one or more graphic layers to be covered by a preset area or more with the resized graphic layer among the plurality of graphic layers, and to prevent the selected graphic layers from being loaded to the memory. Thus, it is determine whether one layer covers the other layers.

According to an aspect of an example embodiment, a method of controlling a display apparatus is provided, the method comprising: receiving a web-based content comprising a plurality of objects; loading data of an image in a memory; and displaying the image based on the data loaded in the memory, the loading the data comprising loading data of a first object in the memory without loading data of a second object in the memory if an area of the first object is displayed to cover areas of one or more second objects among the plurality of objects of the web-based contents. Since the second objects covered with the first object and thus not shown or displayed on the screen are not loaded in the memory, it is possible to minimize and/or reduce wasteful operations. Further, the load of the display apparatus is reduced, thereby securing the speed of executing the first object.

The loading the data may comprise determining whether the first object is subject to a 3D graphic process in response to an instruction for covering the areas of one or more second objects with the area of the first object; and processing the first object to be resized and displayed based on the instruction if it is determined that the first object is subject to the 3D graphic process. Thus, if the first object is subject to the 3D graphic process requiring a high-degree calculation process, the speed of executing the first object is not substantially reduced.

It may be determined that the first object is subject to the 3D graphic process if the first object is processed by calling out a preset API when the first object is loaded to the memory. For example, the preset API may comprise a WebGL. Thus, it can be determined whether the first object is subject to a relatively high-degree calculation process.

Further, the displaying the area of the first object to cover the areas of the one or more second objects may comprise displaying the first object on a whole display area preset to display the image of the web-based content in the display. For example, the present aspect is applied when a user instructs the first object to be displayed as a full screen in the display or the web view of the web browser.

BRIEF DESCRIPTION OF THE DRAWINGS

The above and/or other aspects will become apparent and more readily appreciated from the following detailed description, taken in conjunction with the accompanying drawings, in which like reference numerals refer to like elements, and wherein:

FIG. 8 is a diagram illustrating an example of a web document written based on a hypertext markup language (HTML) structure;

DETAILED DESCRIPTION

Example embodiments will be described in greater detail below with reference to accompanying drawings. The following descriptions of the example embodiments are made by referring to elements illustrated in the accompanying drawings, in which like numerals refer to like elements having substantively the same functions.

In the description, an ordinal number used in terms such as a first element, a second element, etc. may be employed for describing variety of elements, and the terms may be used for distinguishing between one element and another element. Therefore, the meanings of the elements are not limited by the terms, and the terms are also used just for explaining the corresponding embodiment without limiting the idea of the disclosure.

Further, the example embodiments may describe only elements directly related to the idea of the embodiment, and description of the other elements may be omitted. However, it will be appreciated that the elements, the descriptions of which are omitted, are not unnecessary to realize the apparatus or system according to the example embodiments. In the following descriptions, terms such as "include" or "have" refer to presence of features, numbers, steps, operations, elements or combination thereof, and do not exclude presence or addition of one or more other features, numbers, steps, operations, elements or combination thereof.

Figure 1:
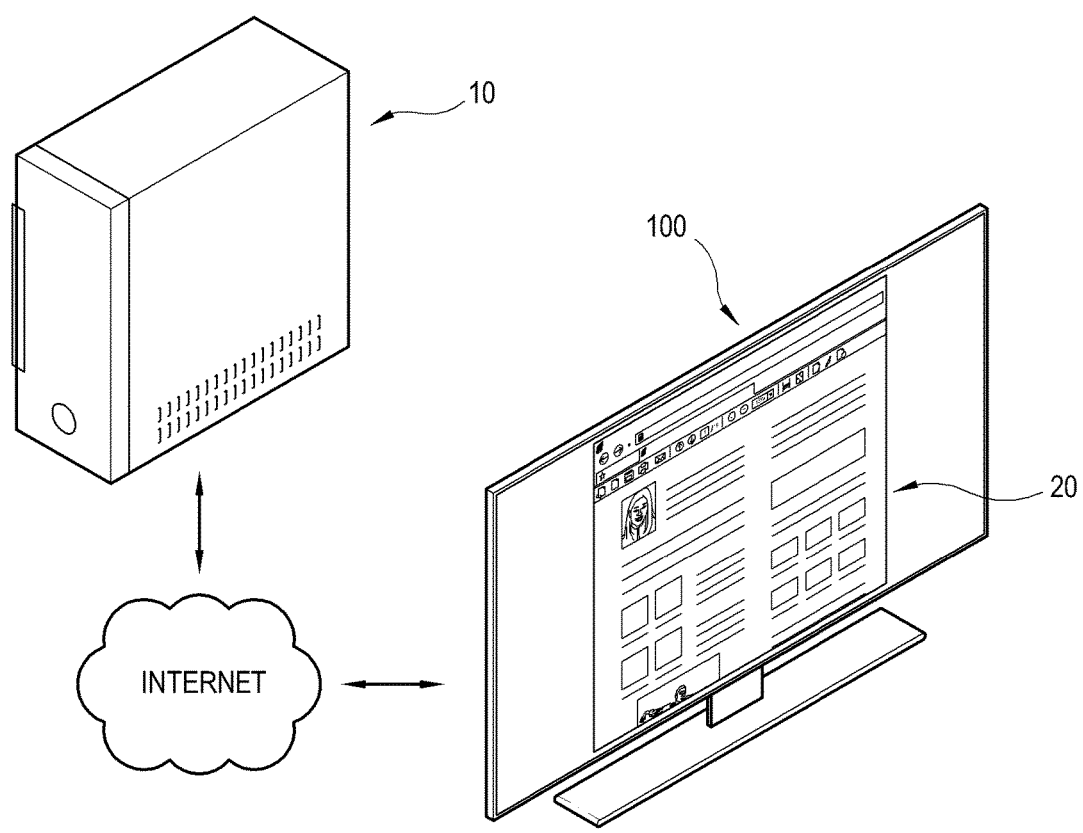
FIG. 1 is a diagram illustrating an example of a display apparatus.

FIG. 1 is a diagram illustrating an example of a display apparatus 100.

As illustrated in FIG. 1, the display apparatus 100 in this example embodiment may be achieved by a television (TV), which displays not only a broadcasting image based on broadcasting content received from a transmitter (not shown) of a broadcasting station but also an image based on various image contents received from a locally connected image reproducer (not shown). Further, the display apparatus 100 can access a server 10 through, for example, the Internet, and receive image contents from the server 10 by, for example, a streaming method, a video-on-demand (VOD) method, or the like method. Further, the display apparatus 100 may receive and execute a web-based content such as the web page 20 or the web application from the server 10.

When the web page 20 is displayed, the display apparatus 100 executes a web browser program, and makes a request for data of the web page 20 corresponding to a certain address input or designated by a user to the server 10. The display apparatus 100 parses data received from the server 10, and displays an image based on the data within a web-page display area of the web browser in accordance with parsing results.

Since the web page 20 is written in accordance with previously agreed-to standards, the display apparatus 100 parses the web page 20 in accordance with the corresponding standards. The web page 20 is based on structural text standards such as, for example, hypertext markup language (HTML), extensible markup language (XML), etc. The structural document may refer, for example, to a document of which a plurality of elements has a hierarchical relationship among them.

As will be described in greater detail below, the display apparatus 100 parses data of the web page 20 and displays the web page 20.

Figure 2:
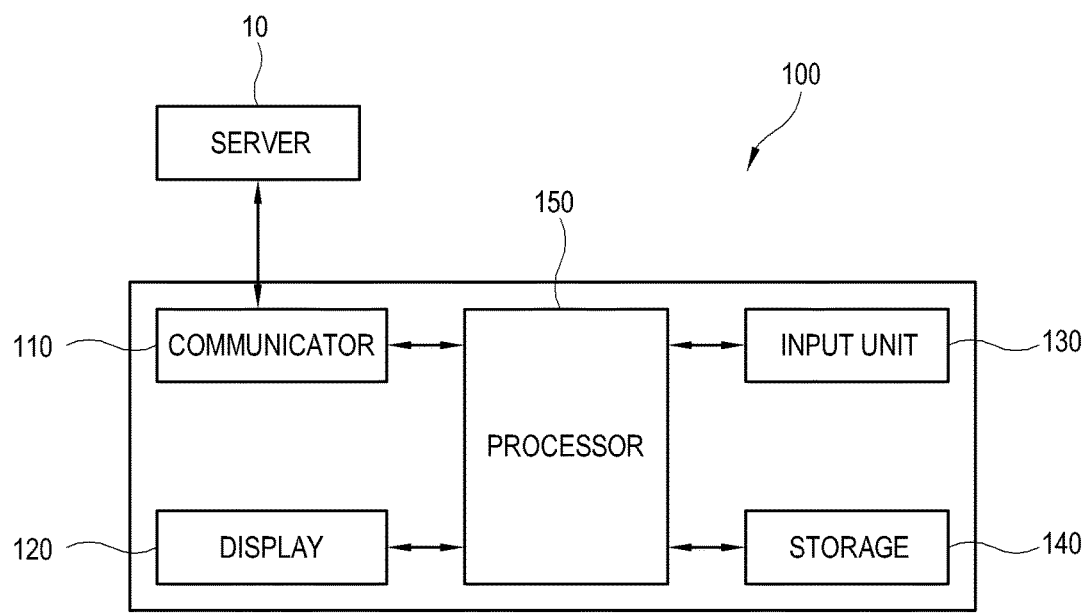
FIG. 2 is a block diagram illustrating an example of the display apparatus of FIG. 1.

FIG. 2 is a block diagram illustrating an example of the display apparatus 100.

As illustrated in FIG. 2, the display apparatus 100 may be, for example, a TV, but is not limited thereto. For example, the display apparatus 100 may be achieved by a portable multimedia player, a tablet personal computer (PC), a mobile phone or the like general electronic apparatus capable of displaying an image. Alternatively, the present disclosure may be applied to a set-top box or a computer, which is not able to display an image by itself and outputs an image to another display apparatus or monitor.

The display apparatus 100 includes a communicator (e.g., including communication circuitry, for example, one or more of a transmitter, receiver, transceiver, or the like) 110 which performs communication to exchange data/signal with the exterior, a display (e.g., including a display panel, display driving circuitry, etc.) 120 which displays an image based on data if the data received by the communicator 110 is an image signal, an input (e.g., input circuitry) 130 configured to receive an input, such as, for example, a user's input operations, a storage (e.g., including a memory) 140 which stores data, and a processor (e.g., including processing circuitry, such as, for example, one or more of a CPU, GPU, or the like) 150 which is configured to control general operations of the display apparatus 100 and to process data.

The communicator 110 transmits/receives data locally or through a network so that the display apparatus 100 can interactively communicate with the exterior server 10 or the like. The communicator 110 may, for example, be achieved by an assembly of connection ports or connection modules based on respective communication standards, and supportable protocols and communication targets are not limited to one kind or type. For example, the communicator 110 may include a tuner (not shown) for receiving a broadcast signal, a wi-fi communication module (not shown) for wireless communication with an access point (AP, not shown), an Ethernet module (not shown) for separate wired connection, and a universal serial bus (USB) port (not shown) for connection with a USB memory, or the like.

The display 120 displays an image based on an image signal processed by the processor 150. For example, the display 120 displays a broadcasting image based on the tuned broadcast signal output from the processor 150. There are no limits to the types of the display 120. For example, the display 120 may be achieved by various display types such as liquid crystal, plasma, a light-emitting diode, an organic light-emitting diode, a surface-conduction electron emitter, a carbon nano-tube, nano-crystal, etc.

The display 120 may include additional elements in accordance with its types. For example, if the display 120 is achieved by the liquid crystal, the display 130 includes a liquid crystal display (LCD) panel (not shown), a backlight unit (not shown) for supplying light to the LCD panel, and a panel driving substrate (not shown) for driving the LCD panel (not shown).

The input unit 130 includes circuitry that transmits various preset control commands or information to the processor 150 in accordance with a received control or input. The input unit 130 changes various events, which may occur, for example, by a user's control in accordance with a user's intention, into information and transmits it to the processor 150. The input unit 130 may be variously achieved in accordance with information input methods. For example, the input unit 130 may include a key/button provided on an outer side of the display apparatus 100, a separate remote controller separated from the display apparatus 100, and a touch screen formed integrally with the display 120, or the like.

The storage 140 stores various data under process and control of the processor 150. The storage 140 is accessed by the processor 315 and performs reading, writing, editing, deleting, updating or the like with regard to data. The storage 140 may, for example, be achieved by a flash-memory, a hard-disc drive or the like nonvolatile memory to preserve data regardless of supply of system power in the display apparatus 100.

The processor 150 is configured to perform various processes with regard to data/signal received in the communicator 110. For example, when an image signal is received by the communicator 110, the processor 150 may be configured to apply an image processing process to the image signal, and to output the processed image signal to the display 120, thereby displaying an image on the display 120.

There are no limits to the kind of image processing process performed by the processor 150, and the video processing process may, for example, include demultiplexing for separating an input signal into sub-signals such as video, audio and additional data, decoding corresponding to image formats of image signal, de-interlacing for converting image data from an interlaced type into a progressive type, scaling for adjusting the image signal to have a preset resolution, noise reduction for improving image quality, detail enhancement, frame refresh rate conversion, etc.

Since the processor 150 can be configured to perform various processes in accordance with the kind and characteristic of data, the process performable by the processor 150 is not limited to the image processing process. Further, data processible by the processor 150 is not limited to only data received in the communicator 110. For example, if a user's voice is input to the display apparatus 100, the processor 150 may be configured to process the voice based on a preset voice processing process. The processor 150 may be achieved, for example, by a system-on-chip (SOC), in which many functions are integrated and which is mounted to a printed circuit board, or an image processing board (not shown) where individual chip-sets for independently performing the processes are mounted to a printed circuit board.

The processor 150 will be described in greater detail below.

Figure 3:
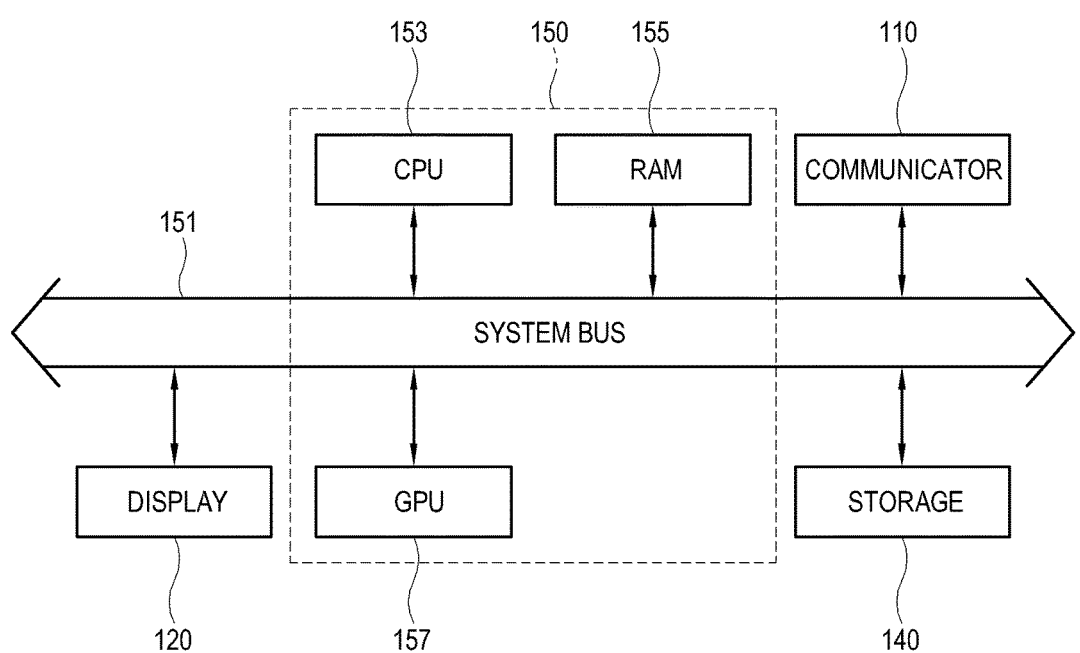
FIG. 3 is a block diagram illustrating an example processor in the display apparatus of FIG. 1.

FIG. 3 is a block diagram illustrating an example processor 150. Elements illustrated in FIG. 3 are related to the present example embodiment, and do not illustrate all elements that comprise the processor 150. To actually realize the processor 150, additional elements not described herein may be needed but descriptions thereof may be omitted since they are not directly related to the disclosure.

As illustrated in FIG. 3, the processor 150 includes, for example, a central processing unit (CPU) 153, a graphic processing unit (GPU) 157 and a random access memory (RAM) 155 which are connected through a system bus 151. The system bus 151 connects with the storage 140, the communicator 110 and the display 120 so that data can be transmitted and received with respect to the CPU 153 or the GPU 157.

The CPU 153 includes hardware where data is calculated and software is executed, which parses and operates a command of a written program and outputs their results to the outside. The CPU 153 is configured to control the whole system of the display apparatus 100 while exchanging data with other elements of the display apparatus 100 through the system bus 151, thereby controlling all the operations of the display apparatus 100. The CPU 153 may be provided, for example, in the form of a micro control unit (MCU) separated from a peripheral integrated chips (ICs), and a system on chip (SOC) combined with ICs.

The CPU 153 may be configured to execute a command by repeating a series of operations including three basic steps of fetching, decoding and executing. The fetching step may, for example, refer to reading one of commands stored in the storage 140 used as a main memory unit, the decoding step may, for example, refer to decoding the read command into control information, and the executing step may, for example, refer to executing the decoded command. When the execution of one command is finished, the CPU 153 starts the fetching step for the next command.

The CPU 153 may include, for example, a processor register to store a command to be processed in the CPU 153, an arithmetic logic unit (ALU) being in charge of performing arithmetic operations and logical operations with regard to data, a control unit for internally controlling the CPU 153 for parsing and executing a command, and an internal bus.

The GPU 157 is in charge of a graphic process, and mainly processes 3D graphic data which requires a great load of operation processes. The CPU 153 and the GPU 157 are similar in terms of processing data/information. While the CPU 153 processes general data, the GPU 157 may be configured to specially process graphic data to be displayed as an image on the display 120. The GPU 157 may include special commands for graphic rendering, and may thus be more efficient for the graphic process than the CPU 153.

The graphic data to be displayed as an image may include, for example, 2D graphic data and 3D graphic data. Between them, the 3D graphic data requires higher-degree calculation process than text data, audio data, and other kinds of data as well as the 2D graphic data. However, the CPU 153 is configured to perform control basic general operations of the display apparatus 100. If the CPU 153 solely processes the 3D graphic data without the GPU 157, the CPU 153 is subject to excessive load, thereby lowering general performance of the display apparatus 100. Accordingly, the GPU 157 may be dedicated to graphic operations and added to the display apparatus 100 to reduce the operation load of the CPU 153.

For example, the data processed by the GPU 157 is not limited to the 3D graphic data, and thus the GPU 157 may also process the 2D graphic data. Further, the GPU 157 may replace the CPU 153 to perform operations for typical applications, and this may, for example, be referred to as general-purpose computing on graphics processing units (GPGPU).

Some terms related to the process of the 3D graphic data in the GPU 157 will be described in greater detail below.

Rendering refers, for example, to a process of making an image from a scene including a certain model or a plurality of models based on a digital operation. Data of one scene includes structuralized objects, a layout of the objects for expressing a scene with the object, a point of view, texture mapping, lighting, shading information, etc. Rendering based on these pieces of information creates a digital image. The rendering method is a process of creating a 2D image from 3D data stored in the scene data along a graphics pipeline basically using the GPU 157.

The graphics pipeline or rendering pipeline may refer, for example, to a stepwise method for expressing a 3D image into a 2D raster image. The raster is a method of making an image into pixels in the form of a 2D layout, and combining the pixels to express a piece of image information.

The texture is a 2D image that is seen when a polygonal solid is rendered by mapping coordinate values in a 3D graphic. For example, the texture mapping is a technique of giving a detailed texture or color to a surface of a virtual 3D object, so that an object can be realistically seen by mapping a 2D image into a surface of a 3D solid.

In the foregoing display apparatus 100, an example of displaying a web page image will be described in greater below.

Figure 4:
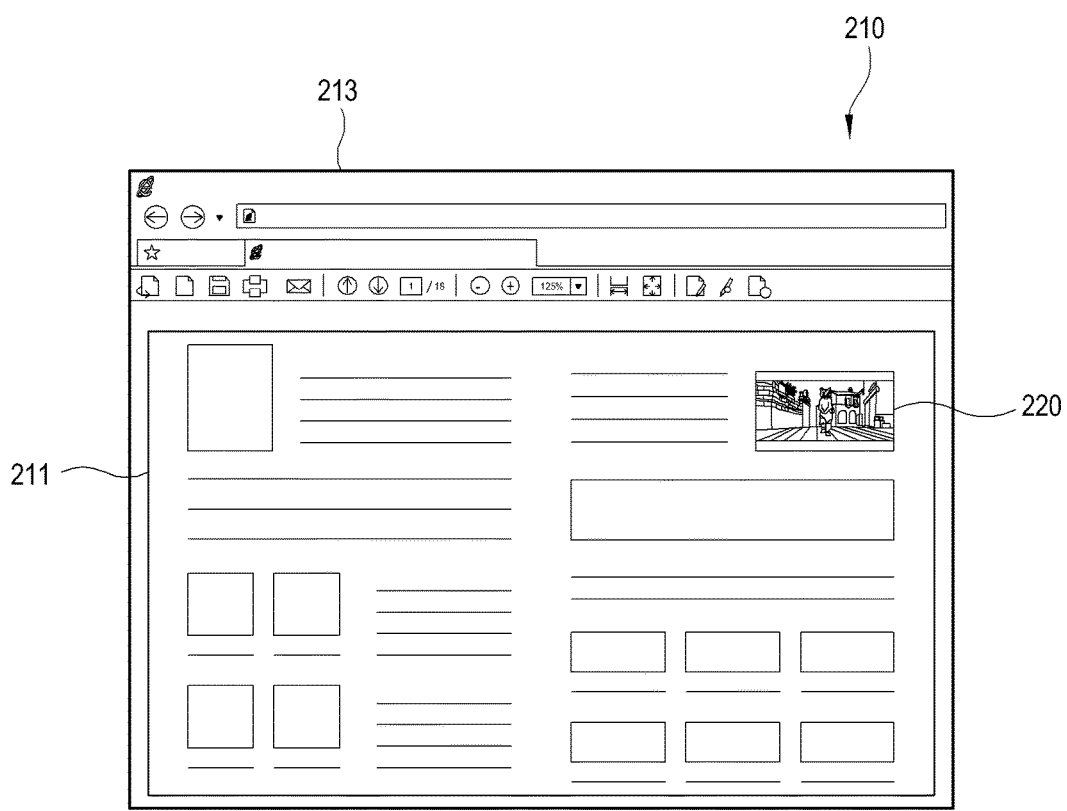
FIG. 4 is a diagram illustrating an example of an image of a web page displayed on the display apparatus of FIG. 1.

FIG. 4 is a diagram illustrating an example of an image of a web page displayed on the display apparatus of FIG. 1.

As illustrated in FIG. 4, a web browser program 210 executed and displayed by the display apparatus 100 includes a web view 211 where an image of a web page is actually displayed, and a browsing frame 213 surrounding the web view 211 and having options for controlling functions related to the web page. If, for example, a user selects display of another web page, the browsing frame 213 provided by the web browser program 210 remains as it is, but the web page displayed on the web view 211 is changed.

The browsing frame 213 may reflect various shapes and functions in accordance with the web browser programs, and may, for example, basically include an address display area for inputting and displaying address of the web page, and a user interface such as various menus for controlling the display of the web page.

As described above, the web page is written by the structural document standards such as HTML, in which data of the web page received in the display apparatus 100 includes various objects having the hierarchical structure. Such an object includes a text, an image, a moving image, audio, a 3D graphic element, etc.

For example, a user may select a certain 3D graphic object 220 within the web page to be displayed as a full screen.

Figure 5:
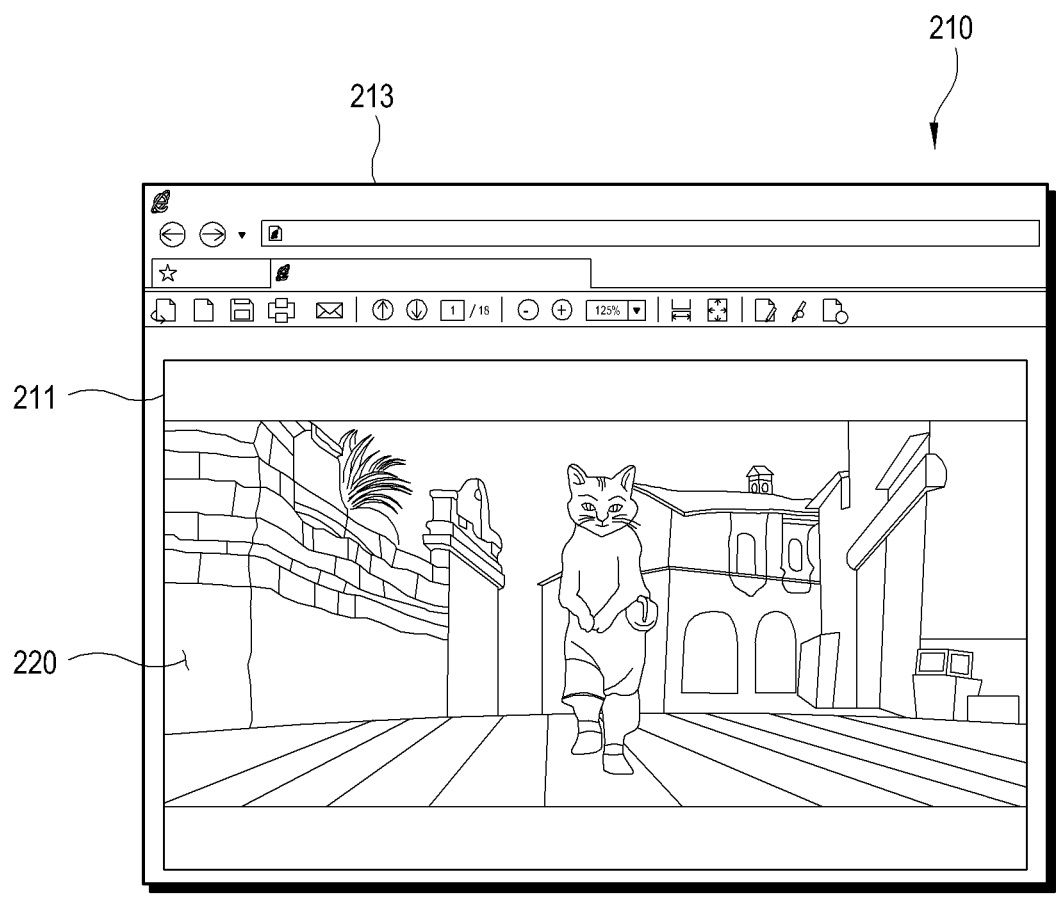
FIG. 5 is a diagram illustrating an example of a certain graphic object in the web page of FIG. 4 is displayed as a full screen.

FIG. 5 is a diagram illustrating an example in which a certain graphic object 220 in the web page of FIG. 4 is displayed as a full screen.

As illustrated in FIG. 5, the graphic object 220 is extended and displayed on the whole displayable area of the web view 211, and the other graphic elements of the web page image are not displayed. For example, the full screen may be based on the web view 211, but is not limited thereto. Alternatively, the full screen may be based on the display 120 (refer to FIG. 2). For example, when the graphic object 220 is displayed as the full screen, the graphic object 220 may be extended and displayed on the whole display area of the display 120 (see, e.g., FIG. 2) as well as the entire area of the web view 211.

Additionally, while the graphic object 220 is being displayed as the full screen, the graphic element rendered as a texture by the display apparatus 100 includes not only the graphic object 220 but also the other objects included in the web page. Since even the other objects not to be displayed are rendered, these unnecessary operations reduce the performance of the display apparatus 100. An example embodiment to address this performance issue will be described later.

The structure of the web page will be described below. The web page may be given in various structures. For example, the web page may include HTML, cascading style sheets (CSS) and Java script.

HTML is one of programming languages used when the web page is written, which has been developed to write a hypertext. HTML has been used in writing most of web pages to be accessed by a web in Internet. HTML has been made to define an electronic document form, which is defined as a subset of international standard generalized markup language (SGML). HTML is a language made up of a general text of American standard code for information interchange (ASCII) codes while emphasizing a hypertext in SGML.

HTML involves instructions for defining letter sizes, letter colors, fonts, graphics, document movement (hyperlink), etc. in a document. HTML not only shows structural meaning for a title, a paragraph, a list or the like text, but also provides a method of writing a structural document with a link, a quotation and other items. HTML may be used in involving various objects and creating an interactive format. HTML is written in the form of a HTML element having tags surround by "< >". HTML may include or load CSS or the like script for determining an outline and layout of Java script, a text and other items to achieve the web page.

CSS is a language of describing that a markup language is actually displayed, which is used in HTML, XHTML, XML, etc. CSS has a high degree of freedom in determining a layout and style. If the markup language is the body of the web page, CSS may be compared to clothes and accessories for decorating the body. A change in only CSS without changing the HTML structure is enough to change a displayed form of the web page.

The conventional HTML is not free from variously designing and frequently changing the web document. To compensate for this, a style sheet has been made. A standard proposal of the style sheet is CSS. If HTML is used to produce the web page, not only general frame but also fronts have to be selected one by one. However, in the case where the style of the web page is previously stored, change in only one element of the web page causes related content in the whole page to be changed at a time. Therefore, CSS makes the whole document have consistency and shortens working time.

Java script is an object-based script programming language, and overcomes static and simple portions of HTML, thereby expressing a dynamic portion in a web page. Java script is applied by directly writing in an HTML document, and uses a tag of "script" to be separated within the web page.

A structure of a web platform 300 in the display apparatus 100 for displaying a web page will be described below.

Figure 6:
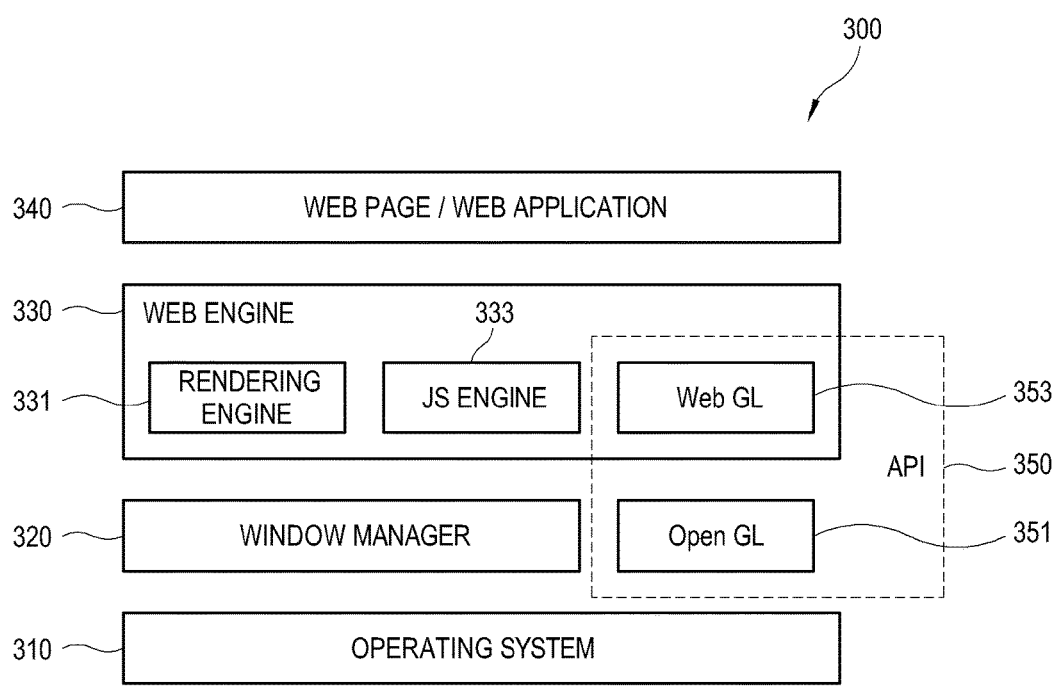
FIG. 6 is a block diagram illustrating an example hierarchical structure of a web platform in the display apparatus of FIG. 1.

FIG. 6 is a block diagram illustrating an example hierarchical structure of a web platform 300 in the display apparatus 100.

As illustrated in FIG. 6, the web platform 300 includes an operating system 310 in a lowest class, a window manager 320 and an OpenGL 351 higher than the operating system 310, and a web engine 330 higher than the window manager 320. A web page/web application 340 is executed on the web engine 330. Further, the web engine 330 includes a rendering engine 331, a JS engine 333, and a WebGL 353. Here, WebGL 353 and OpenGL 351 comprise application programming interface (API) 350.

The operating system 310 is system software to manage system hardware of the display apparatus 100, and provide a hardware abstract platform and a common system service to execute general applications. The operating system 310 provides the CPU and the like system resources to be used by an executed application, and abstracts them to provide a file system or the like service. The operating system 310 provides environments for allowing a user to easily and efficiently execute an application, and efficiently allocates, manages and protects hardware and software resources of the display apparatus, thereby monitoring misused resources and managing operation and control about resources of input/output devices and the like.

The window manager 320 manages process and display of a plurality of windows based on a web browsing program. Here, the windows respectively refer to the browsing frame 213 (see FIG. 4) and the web view 211 (see FIG. 4). The window manager 320 combines the web view 211 (see FIG. 4) displayed by the web engine 330 with the browsing frame 213 (see FIG. 4) in a lower class of the web engine 330, thereby processing the whole browsing image to be displayed.

The web engine 330 processes an image of a web page to be displayed on the web view 211 (see FIG. 4). In comparison with the window manager 320 the web engine 330 performs image processing for a web page, but the window manager 320 processes the window of the web page displayed by the web engine 330 to be displayed together with another separate window. That is, the web engine 330 is concerned with only rendering the web page.

The rendering engine 331 may also be referred to as a web core. The rendering engine 331 parses HTML and CSS of a web page, and renders the parsing results to be displayed as an image. As an example of the rendering engine 331, there are a Webkit engine and a Gecko engine, in which the Webkit engine has started from an open source engine produced for operating in a Linux platform. The rendering class of the Webkit engine uses a runtime type information (RTTI) technique as a function involved in a C++ compiler. The RTTI technique is a method of allowing a type of an object to be determined when the object is executed.

The JS engine 333 may also be referred to as a JS parser. The JS engine 333 parses a Java script code of a web page, and processes it to be executed.

The API 350 refers to an interface made for controlling functions provided by the operating system 310 or the programming language so as to be used by an application. That is, the API 350 is a set of subroutines or functions to be called out by an application to do some processes in the operating system 310. The API 350 is configured to call out a function providing connection with a certain subroutine for execution in an application. Therefore, one API 350 includes several program modules or routines that are previously given or have to be connected for performing a job requested by a function call.

An OpenGL 351 is a 2D and 3D graphic API, developed by Silicon Graphic Incorporated in 1992, and supports intersecting application programming between programming languages or platforms. The OpenGL 351 uses over 250 function calls to produce not only a simple geometrical figure but also a complicated 3D scene.

The graphic library (GL) is classified into a high level and a low level with respect to concreteness, and the OpenGL 351 belongs to the low-level graphic library. A high-level graphic library such as a virtual reality modeling language (VRML) defines relationship between objects to thereby draw a scene. On the other hand, the low-level graphic library gives importance to a rendering function rather than a modeling function, and needs to issue detailed commands one by one to thereby draw a basic element of an object. The low-level graphic library is more difficult to use but has more detailed expression than the high-level graphic library.

The OpenGL 351 includes two graphic libraries of GL and GLU. The GL is a core library of providing a basic drawing function, and corresponds to a main body of the OpenGL 351. The GL has functions for rendering a primary figure. On the other hand, the GLU is a utility library to assist the GL. The GLU provides high-quality functions such as division, projection, etc., and provides a convenient function for producing a sold figure.

The WebGL 353 is a web-based graphic library. The WebGL 353 may be usable through Java script languages, and allow a compatible web browser to use an interactive 3D graphic. The WebGL 353 is a part of canvas HTML element that provides a 3D graphic API without using plug in.

The WebGL 353 is based on OpenGL ES 2.0, and provided a programming interface to use the 3D graphic. Here, the OpenGL ES is an Open GL for an embedded terminal. The OpenGL ES is a subset of the Open GL, i.e. a 3D computer graphic API, which is an API for the embedded terminal such as a mobile phone, a personal digital assistant (PDA), etc.

To display a graphic object of a web page or the web application 340, the OpenGL 351 is called out with respect to the corresponding graphic object and loaded to a texture. However, in case of a web-based graphic object, it may be difficult to call out the function of the OpenGL 351 in consideration of design structure. Thus, the function of the WebGL 353 is called out with respect to the graphic object, and a corresponding function of the OpenGL 351 is called out again by the called function of the WebGL 353. That is, the web-based graphic object calls out the OpenGL 351 via a procedure of calling out the WebGL 353.

The WebGL 353 is to subject a web-based application or an object of a web document to 3D rendering by an acceleration process of the GPU. That is, the 3D graphic object may be materialized in a web by calling out the WebGL 353.

The display apparatus 100 displays the web page as an image as described in greater detail below.

Figure 7:
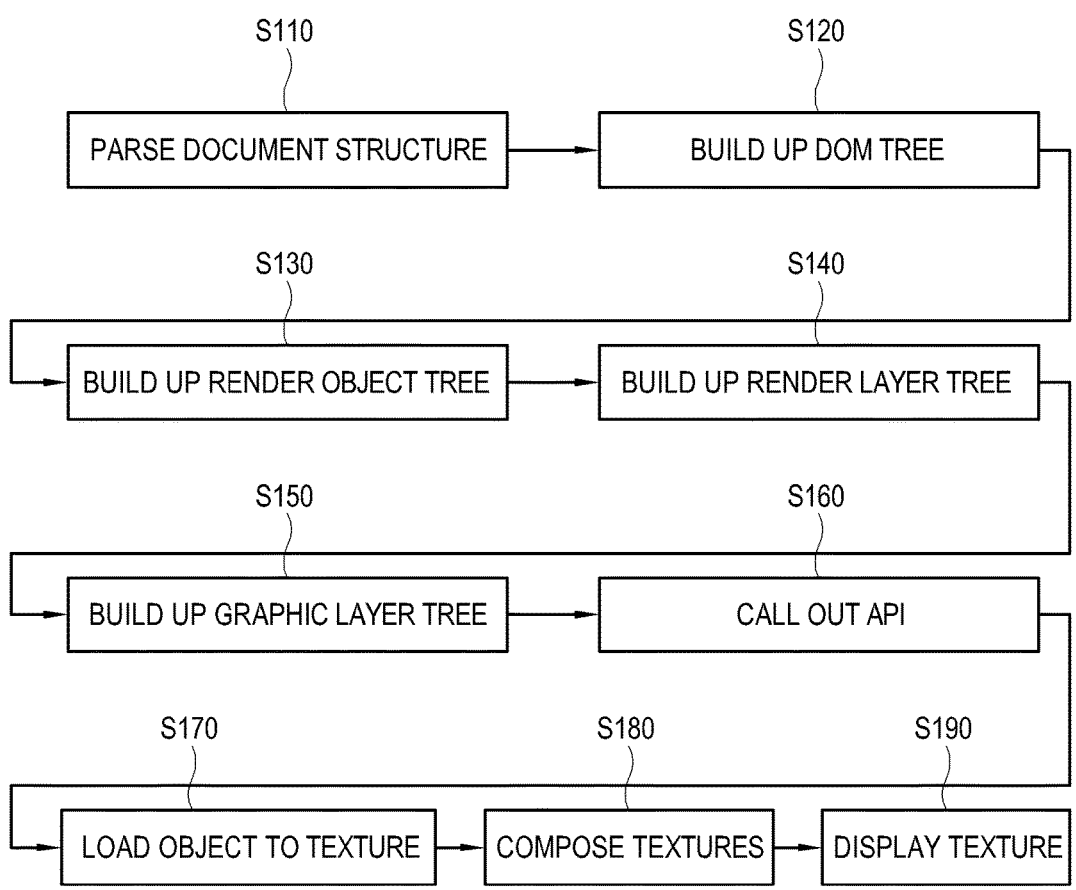
FIG. 7 is a block diagram illustrating an example parsing operation in the display apparatus of FIG. 1 to display the web page as the image.

FIG. 7 is a block diagram illustrating an example parsing operation in the display apparatus 100 to display the web page as the image.

As illustrated in FIG. 7, at operation S110, the display apparatus 100 parses a document structure of the web page. The parsing of the document structure may include parsing of HTML, CSS, Java script of the web page, in which data in the web page is classified into tag, script, data, etc.

At operation S120, the display apparatus 100 builds up a DOM tree based on the parsing result of the document structure. That is, the display apparatus 100 changes a tag of the HTML document into a DOM node, thereby classifying and laying out sub contents.

At operation S130, the display apparatus 100 builds up a render object tree based on the DOM tree. The render object tree has a structure where style elements defined in the CSS with respect to the DOM tree are combined. The render object tree includes all pieces of DOM information of a document to be displayed as an image, and style information of each DOM node.

At operation S140, the display apparatus 100 builds up the render layer tree based on the render object tree. The render layer tree is a set of nodes to be actually displayed among the nodes of the render object tree. That is, the render layer tree does not include the nodes not to be displayed on the screen, by which the display apparatus 100 performs painting for displaying an image of the web page.

At operation S150, the display apparatus 100 builds up a graphic layer tree based on the render layer tree. The graphic layer tree is a set of nodes using an accelerated compositor among the nodes of the render layer tree.

The accelerated compositor combines the notes of the graphic layer tree to be processed by the GPU. While the 2D graphic rendering used in an early web platform is performed by the CPU, the 3D graphic rendering used in a web game or the like requires the high-degree calculation process and is thus performed by the GPU rather than the CPU. The WebGL supports the 3D graphic rendering, and thus the accelerated compositor combines the 3D graphic objects to be rendered as a texture in response to a call of the WebGL.

Both the render layer tree and the graphic layer tree include the graphic objects to be displayed as images. However, the graphic layer tree includes only the nodes requiring the high-degree calculation process of the GPU like the 3D graphic object. On the other hand, the render layer tree includes the nodes of the graphic layer tree, and the nodes of the 2D graphic objects processed by the CPU or GPU without requiring the high-degree calculation process.

At operation S160, the display apparatus 100 calls out an API with regard to each node of the graphic layer tree.

At operation S170, the display apparatus 100 loads each graphic object to each texture of a video memory in accordance with the call of the API.

At operation S180, the display apparatus 100 combines the respective textures loaded into the video memory.

At operation S190, the display apparatus 100 displays the combined texture. Thus, the display apparatus 100 displays a web page.

A method of building up a DOM tree based on a HTML document will be described below.

FIG. 8 is a diagram illustrating an example of a web document written based on a hypertext markup language (HTML) structure.

Figure 9:
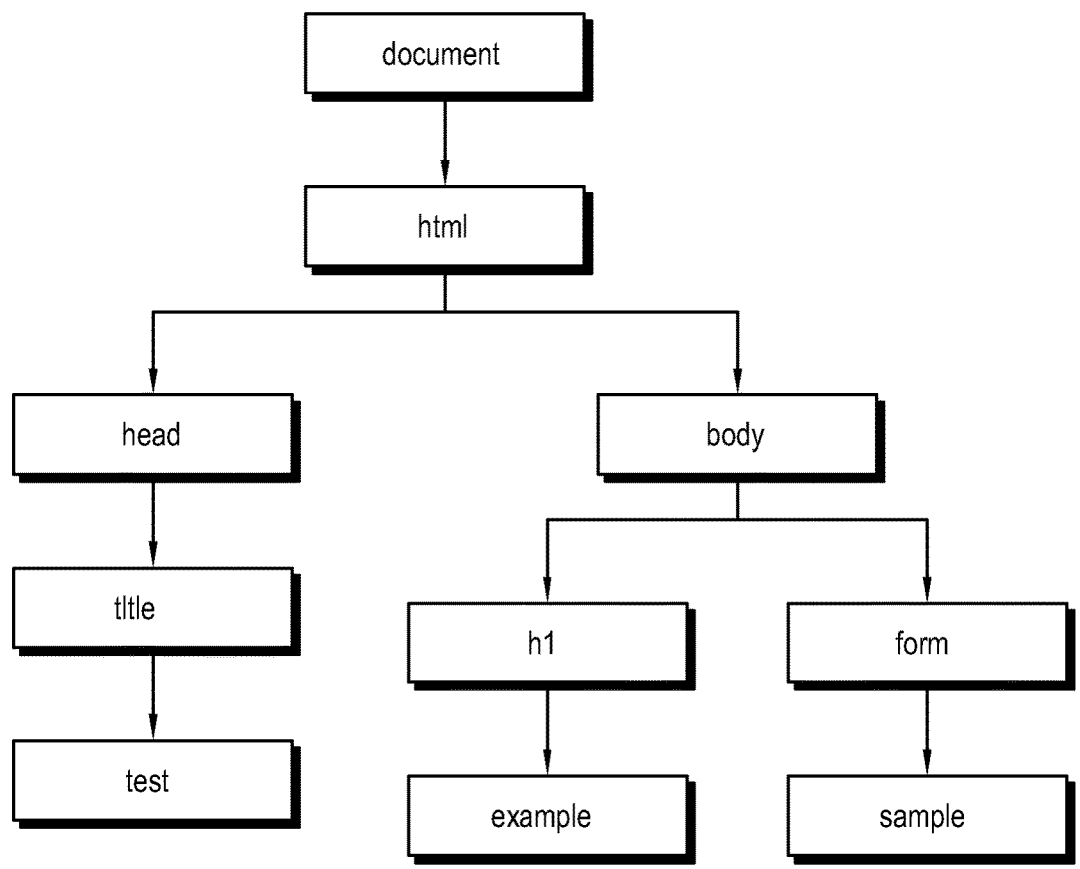
FIG. 9 is a diagram illustrating an example of a document object model (DOM) tree built based on the HTML structure of the web document of FIG. 8.

FIG. 9 is a diagram illustrating an example of a document object model (DOM) tree built up based on the HTML structure of the web document of FIG. 8.

As illustrated in FIG. 8, the web document describes a text content within a HTML tag. The tags include a head and a body within HTML, in which the head has a title, and the body has h1 and form. The title tag has a content of "test", an h1 tag has a content of "example", and a form tag has a content of "sample".

Thus, each tag and contents written in HTML are classified into an upper class and a lower class, and the DOM tree for more clearly showing such a hierarchical structure can be built up from the HTML structure.

As illustrated in FIG. 9, a root node of html is provided under a node of the whole web document. Under html, there are a node of head and a node of body. A node of title is provided under the node of head, and nodes of h1 and form are provided under the node of body. Further, contents of "test", "example" and "sample" are provided under the node of title, h1 and form, respectively.

To display a web page, the display apparatus 100 first parses the document described as illustrated in FIG. 8 and builds up the DOM tree as illustrated in FIG. 9, thereby deriving the render object tree, the render layer tree and the graphic layer tree based on the DOM tree.

A principle of displaying objects in the graphic layer tree after building up the DOM tree will be described below.

Figure 10:
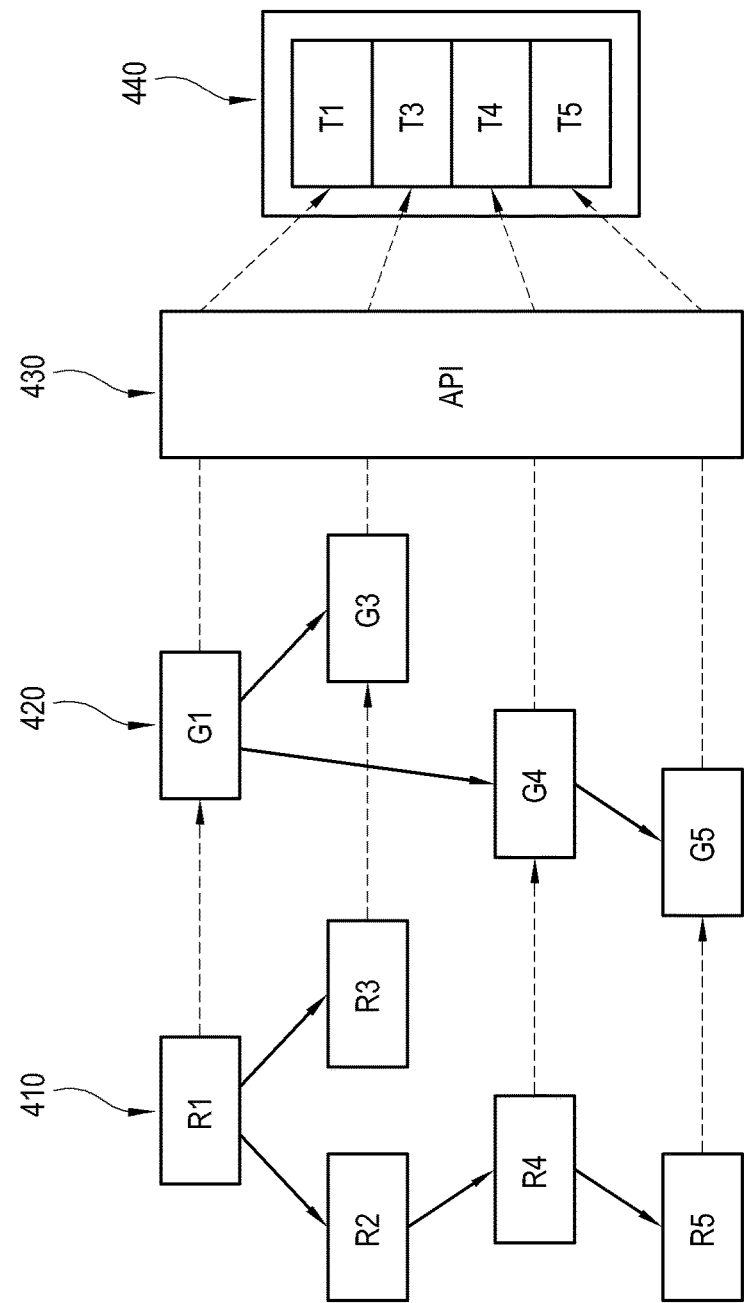
FIG. 10 is a diagram illustrating an example of displaying objects, in which acceleration processes of a GPU are performed, among objects of a render object tree.

FIG. 10 is a diagram illustrating an example of displaying objects, in which acceleration processes of a GPU are performed, among objects of a render object tree 410. For convenience of description, the DOM tree and the render layer tree are not illustrated in FIG. 10. However, the DOM tree and the render layer tree are built up in an actual parsing.

In FIG. 10, the render object tree 410 built up from the DOM tree includes five nodes R1, R2, R3, R4 and R5 by way of example. In the render object tree 410, arrows between the respective nodes R1, R2, R3, R4 and R5 show a hierarchical relationship. In this example embodiment, a second node R2 and a third node R3 are sub classes of a first node R1, a fourth node R4 is a sub class of the second node R2, and a fifth node R5 is a sub class of the fourth node R4.

Among these nodes R1, R2, R3, R4 and R5, the other nodes excluding the node R2 not to be rendered are built up as the render layer tree. Further, nodes R1, R3, R4 and R5 to be processed again by the GPU are built up as the graphic layer tree 420. That is, the nodes G1, G3, G4 and G5 of the graphic layer tree 420 correspond some nodes R1, R3, R4 and R5 of the render object tree 410.

Operations up to building up the graphic layer tree 420 are processed by the CPU, and the following operations are processed by the GPU. The GPU calls an API 430 with regard to the nodes G1, G3, G4 and G5 of the graphic layer tree 420, and the results from process by the call of the API 430 are respectively loaded to textures T1, T3, T4 and T5 of the video memory 440. In this example embodiment, the API 430 includes a WebGL and an OpenGL, in which the function of the WebGL is called out with regard to each node G1, G3, G4, G5 and the function of the OpenGL is called by the WebGL.

The GPU composes the respective textures T1, T3, T4 and T5 loaded to the video memory 440 and displays them on the web view. With this procedure, the display apparatus 100 can display an image of a web page.

By the way, as described with reference to FIG. 4 and FIG. 5, if a certain object requiring the process of the GPU among the objects included in the web page image is displayed as a full screen, the foregoing processing method may waste the operation process. Here, the full screen may include a full screen in the web view or a full screen in the display.

That only a certain object is displayed as the full screen on the web view object may, for example, refer to the case that the other objects excluding the displayed object are not displayed in the web view. However, in the foregoing process, all textures T1, T3, T4 and T5 are composite and displayed corresponding to the respective nodes G1, G3, G4 and G5 of the graphic layer tree 420. For example, if the texture T5 corresponding to a certain node G5 is displayed as a full screen, the other textures T1, T3 and T4 excluding the texture T5 corresponding to a certain node G5 of the graphic layer tree 420 are unnecessary elements. That the other textures T1, T3 and T4 are unnecessary elements is that there are no needs of including the corresponding nodes in the previous stage of building up the render object tree 410 and the graphic layer tree 420.

Accordingly, if the object classified as requiring the high-degree calculation process among the objects of the web page is displayed as a full screen, the foregoing example embodiment includes the unnecessary rendering process and thus increases the operation loads of the CPU and the GPU.

To address the problems of the foregoing example embodiment, a second embodiment will be described below.

Figure 11:
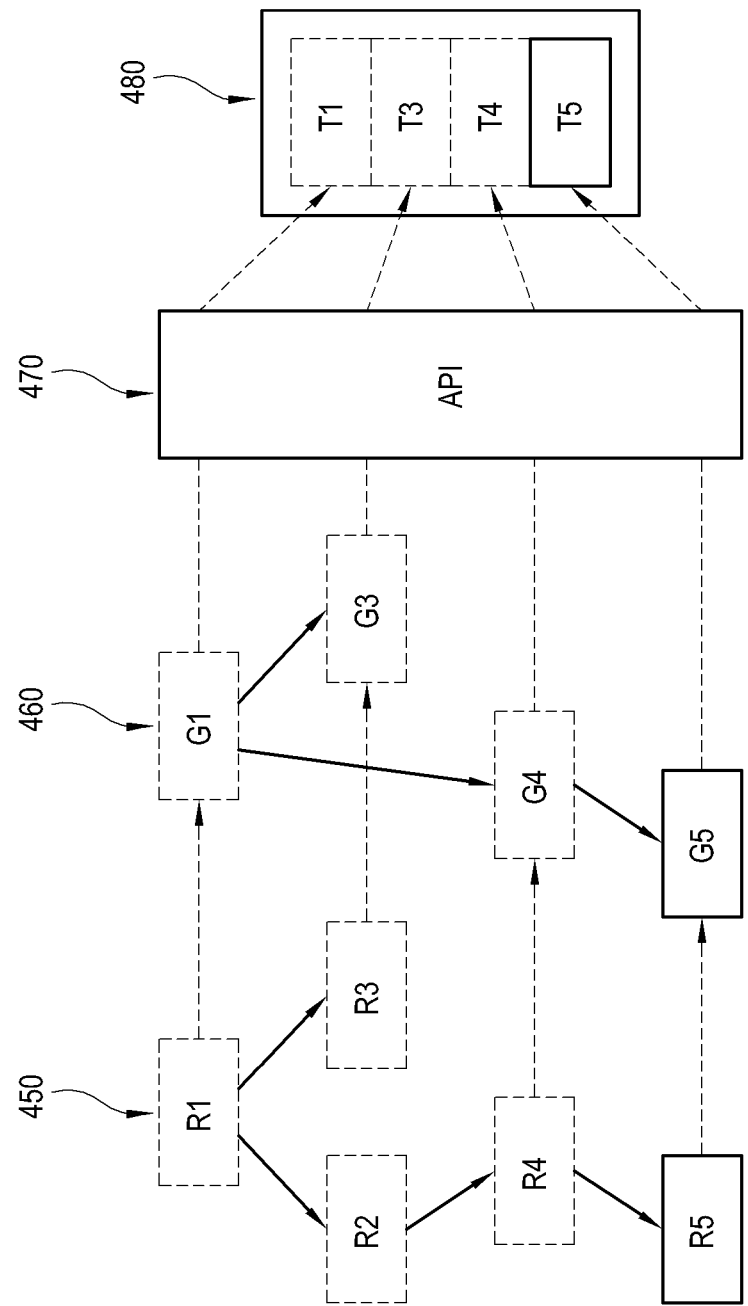
FIG. 11 is a diagram illustrating an example of displaying objects, in which acceleration processes of the GPU are performed, among objects of a render object tree.

FIG. 11 is a diagram illustrating an example of displaying objects, to which acceleration processes of the GPU are applied, among objects of a render object tree according to a second example embodiment. FIG. 11 illustrates the example embodiment against that of FIG. 10.

Referring to FIG. 11, it will be considered that a user selects a certain object R5 to be displayed as a full screen in the currently displayed web page. The display apparatus 100 parses the DOM structure of the web page in response to such a user's input. The display apparatus 100 builds up a render object tree 450 in accordance with results from parsing the DOM structure.

Here, the display apparatus 100 includes only the node R5 to be displayed as the full screen in the render object tree 450, and excludes the nodes R1, R2, R3 and R4 not to be displayed from the render object tree 450.

Thus if the render object tree 450 is built up, the graphic layer tree 460 derived from this tree also includes only the node R5 to be displayed as the full screen. The node G5 is loaded to the texture T5 of the video memory 480 by calling out the API 470.

Since the video memory 480 in this example embodiment is loaded with only the texture T5, the display apparatus 100 displays only the texture T5 in the web view without any separate composition operation.

In the foregoing example embodiment illustrated in FIG. 10, since the textures T1, T3, T4 and T5 corresponding to the nodes R1, R3, R4 and R5 of the render object tree 410 (see FIG. 10) are loaded to the video memory 440 (see FIG. 10), not only the texture T1, T3 and T4 not to be displayed but also the texture T5 to be displayed as the full screen are composite in the display apparatus 100.

On the other hand, in this example embodiment, only the node R5 to be displayed as a full screen is rendered, but the other nodes R1, R2, R3 and R4 are not rendered. The tree structure is parsed and built up by the CPU. Since the nodes R1, R2, R3 and R4 not to be displayed as the full screen are excluded from the tree structure, it is possible to reduce the calculation load of the CPU. On the other hand, the call of the API 470, rendering of the texture and display of an image are performed by the GPU. Here, the nodes R1, R2, R3 and R4 not to be displayed as the full screen are not processed, and it is therefore possible to decrease the calculation load of the GPU.

In brief, the present example embodiment is as follows. The display apparatus 100 extracts a plurality of objects for displaying an image from a web-based content, and loads the plurality of extracted objects to the memory, thereby displaying the image of the web-based content. The plurality of objects are arranged at a designated position within the image.

Suppose that a user selects a first object to be displayed as a full screen among the objects. However, a user's selection may be not the full screen but resizing the first object. In response to an instruction to enlarge the first object, the display apparatus 100 adjusts the first object to be enlarged, and displays it. At this time, there may be one or more second object positioned to be covered with the resized first object among the plurality of objects within an image. In this example, the display apparatus 100 prevents one or more covered second objects from being loaded to the memory, and thus the second object is not rendered.

A control method of the display apparatus 100 according to an example embodiment will be described below.

Figure 12:
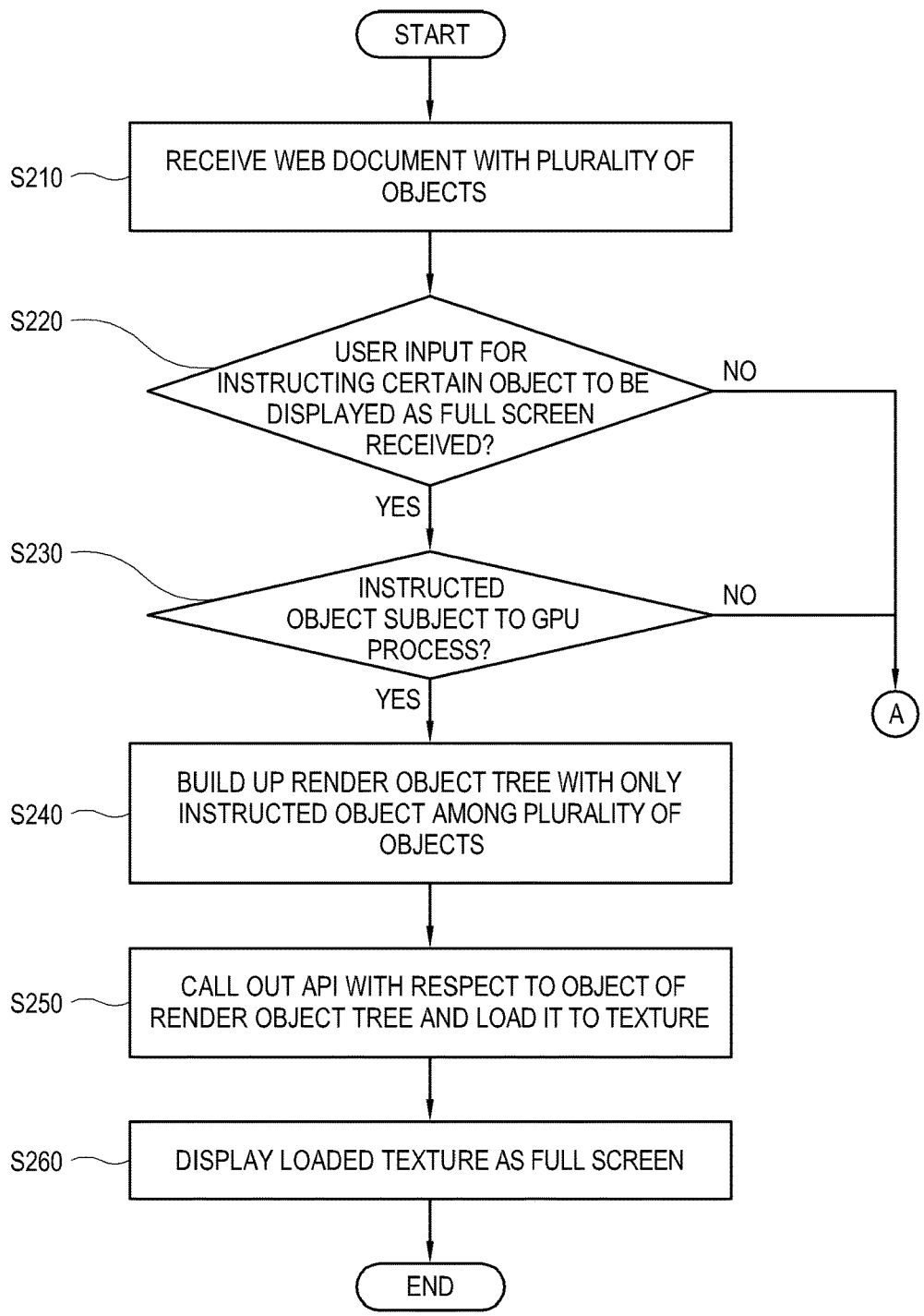
FIG. 12 and FIG. 13 are flowcharts illustrating an example control method of a display apparatus.
Figure 13:
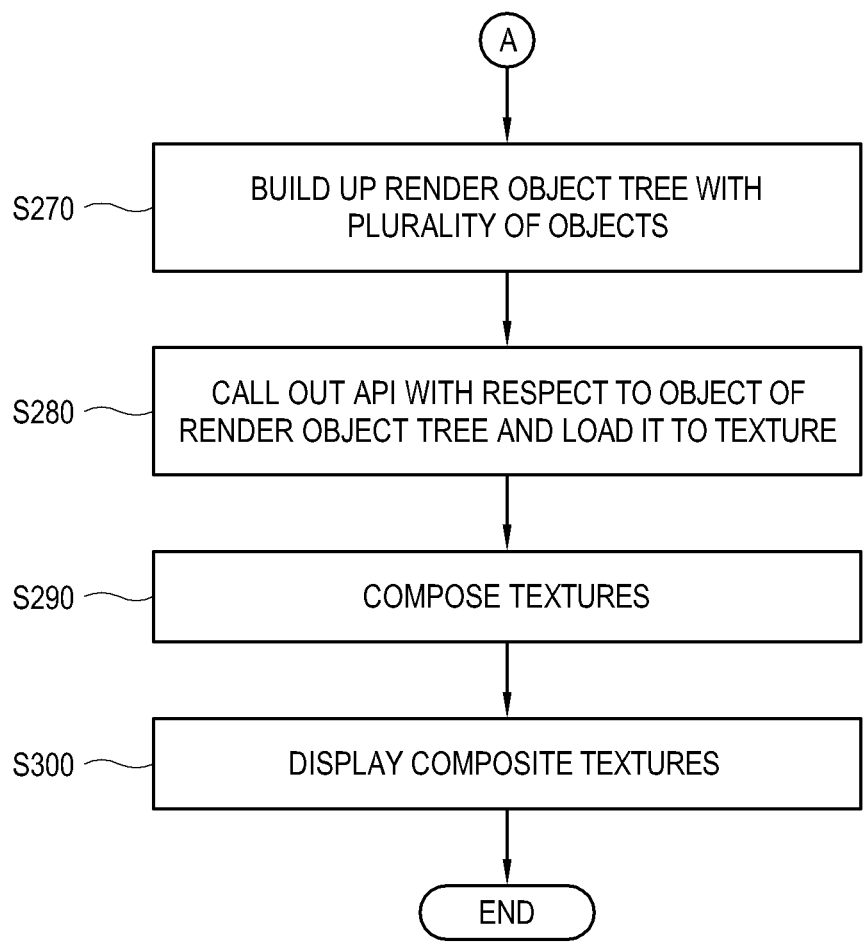

FIG. 12 and FIG. 13 are flowcharts illustrating an example control method of the display apparatus 100.

As illustrated in FIG. 12, at operation S210 the display apparatus 100 receives a web document including a plurality of objects.

At operation S220, the display apparatus 100 determines whether an input, e.g., a user's input, for instructing a certain object of the web document to be displayed as a full screen is received or not.

If the corresponding user's input is received, at operation S230, the display apparatus 100 determines whether the instructed object is subject to the process of the GPU.

If it is determined that the instructed object is subject to the process of the GPU, at operation S240, the display apparatus 100 builds up the render object tree of only the instructed object among the plurality of objects of the web document.

At operation S250, the display apparatus 100 calls out the API with respect to the object of the render object tree and loads it into the texture.

At operation S260, the display apparatus 100 displays the loaded texture as the full screen.

As illustrated in FIG. 13, if it is determined in the operation S220 that a user's input is not received or in the operation S230 that the object is not subject to the process of the GPU, the display apparatus 100 enters an operation S270 to perform typical processes.

At operation S270, the display apparatus 100 builds up the render object tree to include the plurality of objects of the web document.

At operation S280, the display apparatus 100 calls out an API with respect to the object of the render object tree and loads it into each texture.

At operation S290, the display apparatus 100 composes the textures to which the plurality of objects are respectively loaded.

At operation S300, the display apparatus 100 displays the composite textures.

In this example embodiment, the display apparatus 100 determines whether or not the object instructed by a user to be displayed as the full screen is subject to the process of the GPU. However, the display apparatus 100 may not distinguish between the CPU and the GPU, but determine whether the object needs to be subject to the high-degree calculation process. Alternatively, the display apparatus 100 may determine whether the object needs a call of a certain API, i.e. WebGL. A control method according to this example embodiment will be described below.

Figure 14:
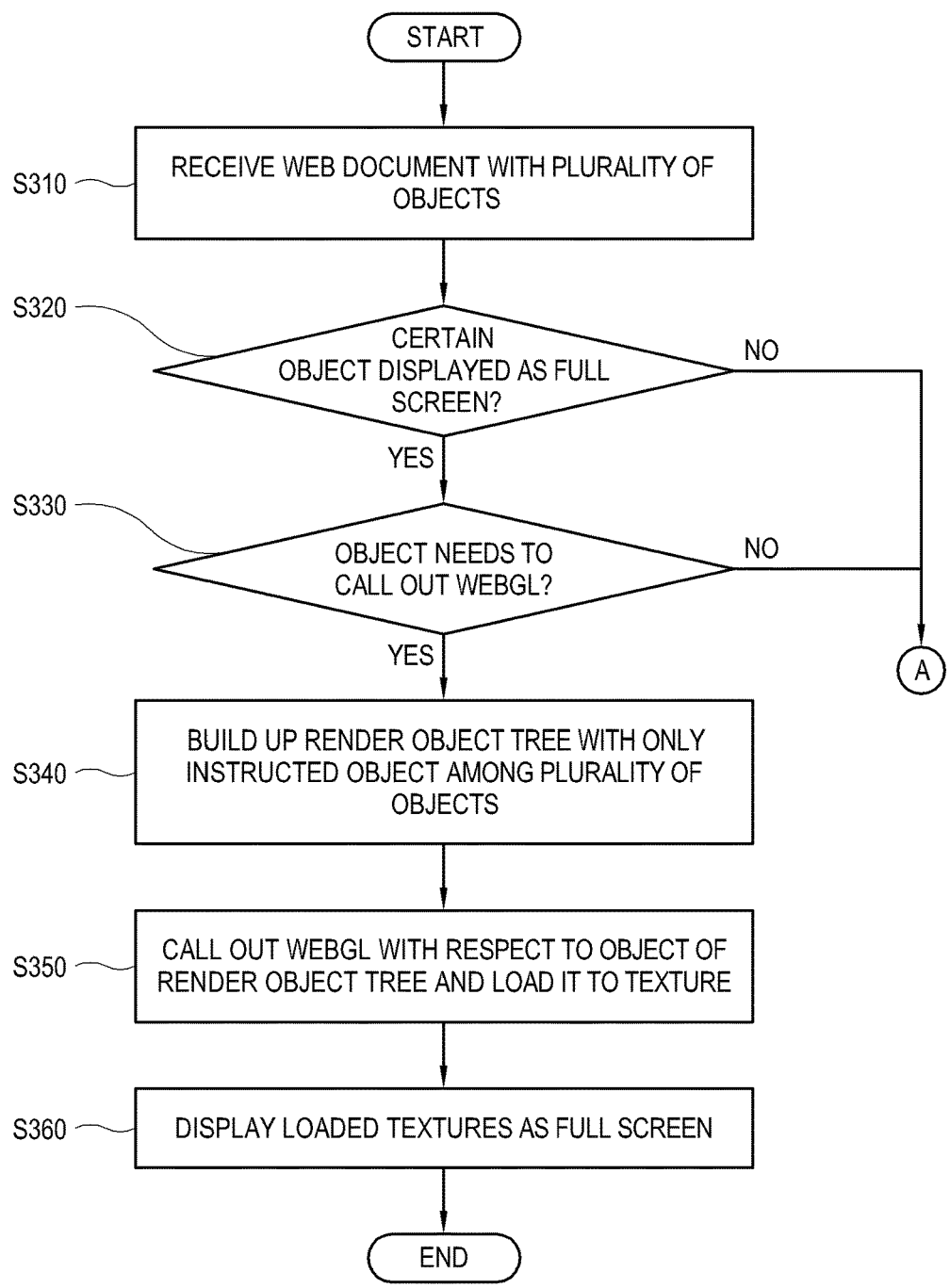
FIG. 14 is a flowchart illustrating an example control method of a display apparatus.

FIG. 14 is a flowchart illustrating an example control method of a display apparatus 100 according to a third example embodiment.

As illustrated in FIG. 14, S310, the display apparatus 100 receives a web document including a plurality of objects.

At operation S320, the display apparatus 100 determines whether a user's input for instructing a certain object of the web document to be displayed as a full screen is received or not. If it is determined that the corresponding user's input is not received, the foregoing operations shown in FIG. 13 are implemented.

If it is determined that the corresponding user's input is received, at operation S330 the display apparatus 100 determines whether the instructed object needs to call out the WebGL. If it is determined that the instructed object does not have to call out the WebGL, the foregoing operations shown in FIG. 13 are implemented.

If it is determined that the instructed object needs to call out the WebGL, at operation S340, the display apparatus 100 builds up the render object tree to include only the instructed object among the plurality of objects of the web document.

At operation S350, the display apparatus 100 calls out the WebGL with respect to the object of the render object tree and loads it to the texture.

At operation S360, the display apparatus 100 displays the loaded texture as a full screen.

In this manner, in the web page or the web application including the object using the WebGL, it is possible to provide a user with smooth scene development through high frames per second (fps). For example, when a web-based game is provided to a user, the game is smoothly played and improved in the web platform graphic performance. Particularly, the web application can provide high graphic performance of a native application level.

Certain aspects of the disclosure will be described below in a different viewpoint from those of the foregoing example embodiments.

Figure 15:
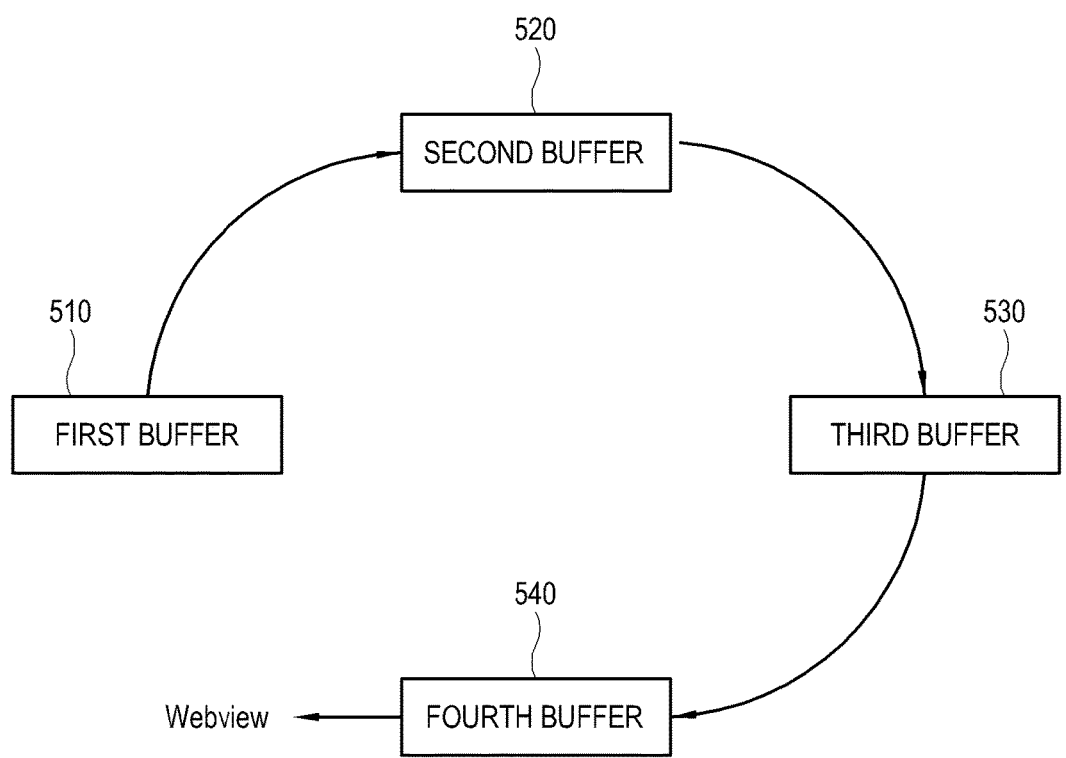
FIG. 15 is a block diagram illustrating example operations of buffers used for rendering a web page in a display apparatus.

FIG. 15 is a block diagram illustrating example operations of buffers 510, 520, 530, 540 used for rendering a web page in a display apparatus 100 according a fourth example embodiment;

As illustrated in FIG. 15, the display apparatus 100 includes buffers 510, 520, 530 and 540 for rendering a web page or an object. In this example, there are four buffers 510, 520, 530 and 540, in which a first buffer 510 is to render the web page, a second buffer 520 is to temporarily store the web page rendered in the first buffer 510, a third buffer 530 is a place where the web page from the second buffer 520 is on standby before being painting the web view, and the fourth buffer 540 is to store the web page to be drawn on the web view.

The third buffer 530 may also be referred to as an off-screen buffer. The fourth buffer 540 may also be referred to as an on-screen buffer, and stores data of a web page while the web page is being displayed on the web view.

The reason why there are many buffers 510, 520, 530 and 540 is because input, display, change, process or the like operation for data of the web page are achieved for a short time. The display apparatus 100 synchronizes the buffers 510, 520, 530 and 540 while the web page or the object is transferred between the buffers 510, 520, 530 and 540, thereby avoiding overflow/underflow of the buffers 510, 520, 530 and 540 and thus normally displaying the web page.

In the foregoing first example embodiment, the data of the web page is input to and painted in the first buffer 510, and then transferred to the second buffer 520, the third buffer 530, and the forth buffer 540 in sequence.

On the other hand, in the foregoing second and third example embodiments, the display apparatus 100 displays only an object using a WebGL as a full screen, and thus the corresponding object is directly rendered on the web view. Accordingly, in this example, only the third buffer 530 and the fourth buffer 540 are used without using the first buffer 510 and the second buffer 520. Since there is no need of a separate composition operation, data of the corresponding object is input to the third buffer 530, and the display apparatus 100 transfers the object from the third buffer 530 to the fourth buffer 540, thereby displaying the object as a full screen in the web view.

Figure 16:
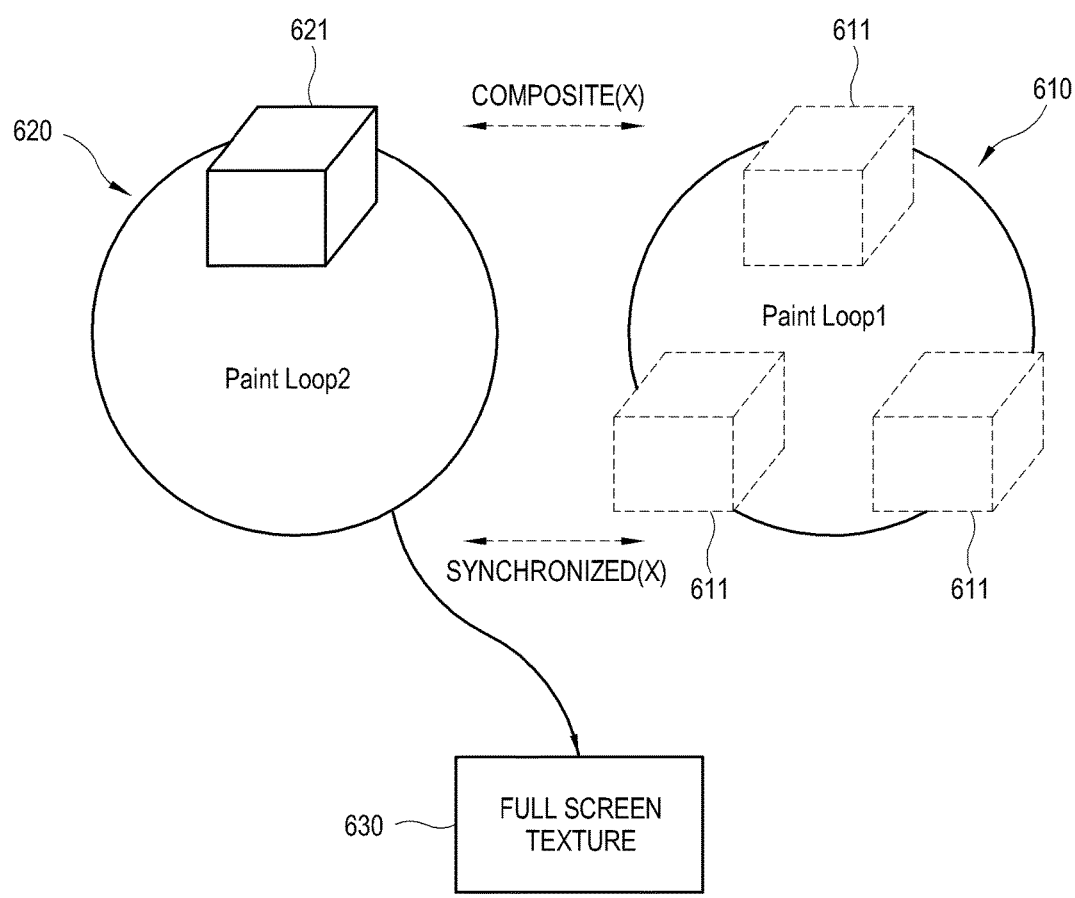
FIG. 16 is a diagram illustrating a principle of an object displayed as a full screen.

FIG. 16 is a diagram illustrating a principle that an object 621 is displayed as a full screen according to a fifth example embodiment.

As illustrated in FIG. 16, the display apparatus 100 includes a first paint loop 610 provided to paint an object 611 that does not use a WebGL; and a second paint loop 620 provided to paint an object 621 that uses the WebGL. The paint loop refers to an operation of painting a certain object or web page in the buffer, in which a term of 'loop' indicates iteration of this operation while the web page is being displayed.

If all the objects 611 and 621 are displayed rather than displaying a certain object 621 as the full screen, the display apparatus 100 composes an object 611 painted by the first paint loop 610 and an object 621 painted by the second paint loop 620 and displays it on the web view. Since there may be a difference between a painting completed time of the first paint loop 610 and a painting completed time of the second paint loop 620, the display apparatus 100 may perform composition through synchronization at a point of time when two painting operations are completed.

On the other hand, if the object 621 is displayed as the full screen, the display apparatus 100 paints the object 621 by only the painting operation of the second paint loop 620 excluding the painting operation of the first paint loop 610, thereby displaying a texture 630 as the full screen in the web view. As described in the foregoing example embodiments, if the render object tree is built up not to include the object 611 in the DOM tree structure, there is no target to be painted in the first paint loop 610, and thus the painting operation of the first paint loop 610 is not performed.

If the painting operation is not performed by the first paint loop 610, the object 611 not using the WebGL is not painted, and thus composition and synchronization between the first paint loop 610 and the second paint loop 620 are not necessary.

Figure 17:
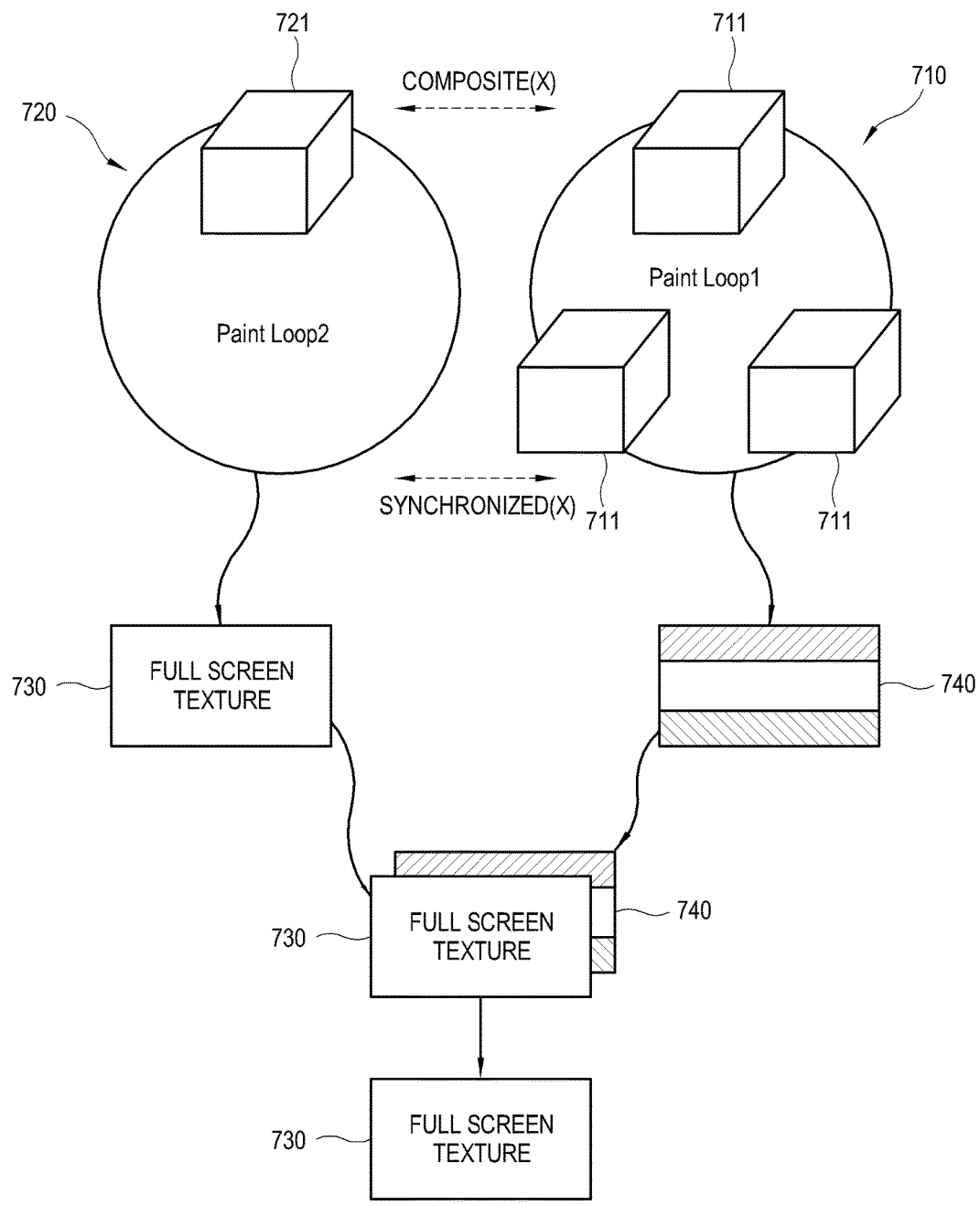
FIG. 17 is a diagram illustrating a principle of an object displayed as a full screen.

FIG. 17 is a diagram illustrating a principle that an object 721 is displayed as a full screen according to a sixth example embodiment.

As illustrated in FIG. 17, the display apparatus 100 includes a first paint loop 710 provided to paint an object 711 that does not use a WebGL; and a second paint loop 720 provided to paint an object 721 that uses the WebGL.

In response to a user's input for instructing the object 721 to be displayed as a full screen, the second paint loop 720 paints the object 721 and produces a full screen texture 730.

In this example embodiment, the render object tree is built up to include an object 711 that does not use a WebGL in a DOM tree structure. Thus, the first paint loop 710 paints the object 711, and produces a composite texture 740 by composing textures of a plurality of objects 711.

If the first paint loop 710 completes the texture 740 and the second paint loop 720 completes the texture 730, the display apparatus 100 selects a full screen texture 730 between these textures 730 and 740 in response to a user's input. The display apparatus 100 displays the selected full screen texture 730 on the web view.

On the contrary to the foregoing fifth example embodiment, this example embodiment discloses that the object 711 is painted by the first paint loop 710, and one of the respectively produced textures 730 and 740 is selectively displayed. That is, this example embodiment and the fifth example embodiment are the same in that the texture 730 of the object 721 using the WebGL is displayed as the full screen, but different in procedure.

Figure 18:
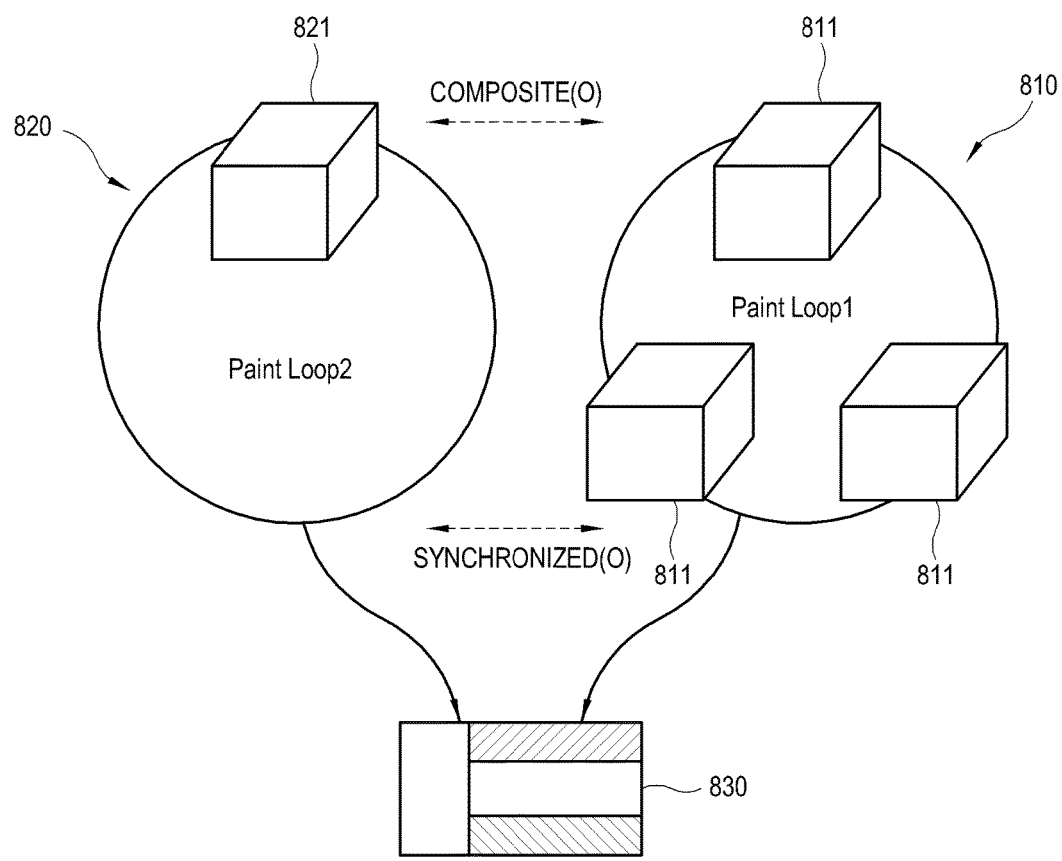
FIG. 18 is a diagram illustrating a principle that an object is displayed.

FIG. 18 is a diagram illustrating a principle that objects 811 and 821 are displayed according to a seventh example embodiment;

As illustrated in FIG. 18, if all the objects 811 and 821 are desired to be displayed instead of displaying one of them as a full screen, a first paint loop 810 paints the object 811 and the second paint loop 820 paints the object 821. In this example embodiment, the first paint loop 810 and the second paint loop 820 are synchronized to display all the objects 811 and 821 on the web view.

If each painting is completed, the texture of the first paint loop 810 and the texture of the second paint loop 820 are composed to thereby produce a composite texture 830. The display apparatus 100 displays the composite texture 830 on the web view.

In this example, one of the first paint loop 810 and the second paint loop 820 is on standby until each painting is completed, thereby performing the composition. However, the synchronization between the first paint loop 810 and the second paint loop 820 may be not performed.

Figure 19:
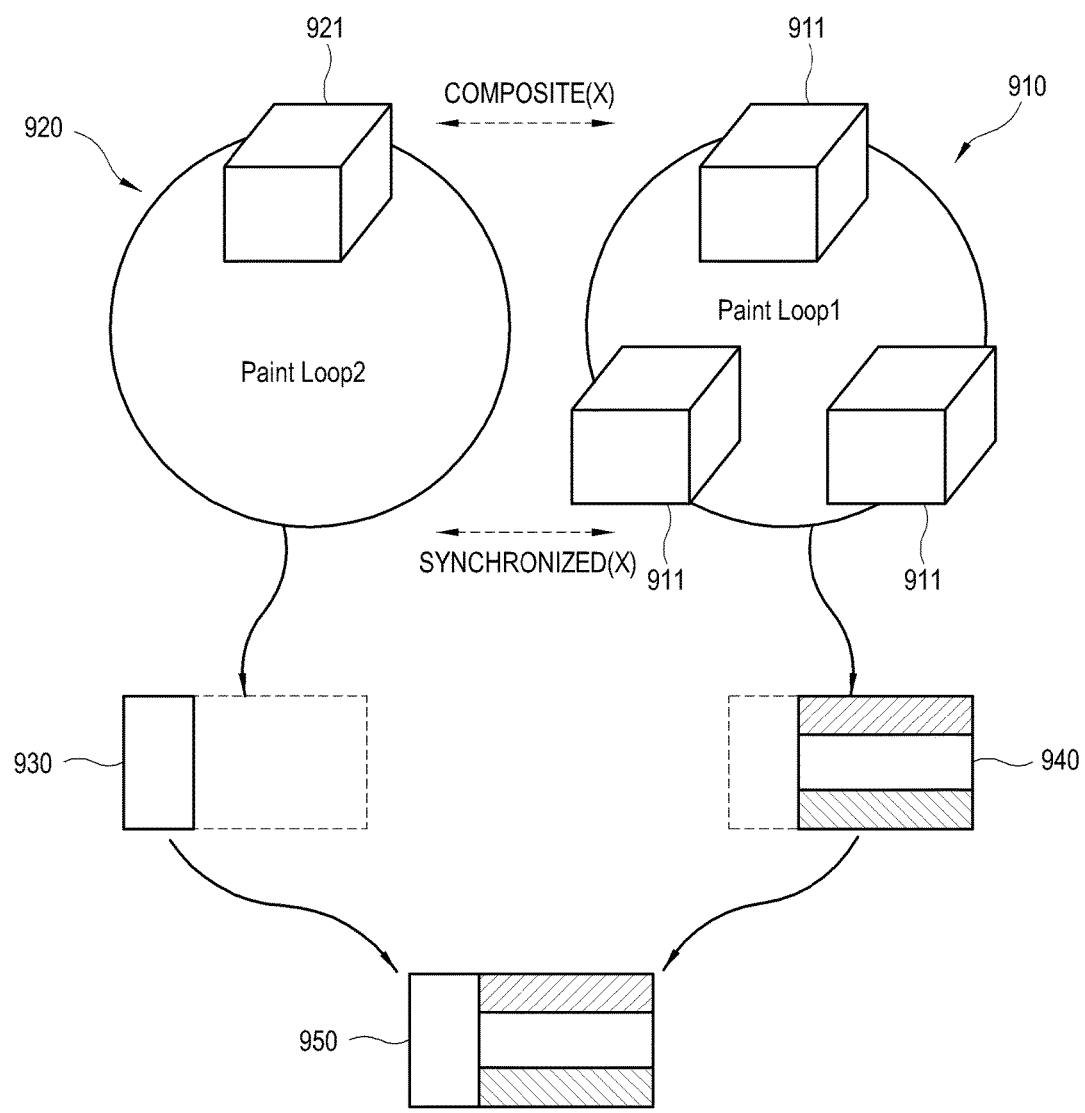
FIG. 19 is a diagram illustrating a principle that an object is displayed.

FIG. 19 is a diagram illustrating a principle that objects 911 and 921 are displayed according to an eighth example embodiment;

As illustrated in FIG. 19, a first paint loop 910 paints the object 911 to produce a texture 930. On the other hand, a second paint loop 920 paints an object 921 to produce a texture 940.

The display apparatus 100 composes two produced textures 930 and 940 to produce a composite texture 950, and displays the composite texture 950 on the web view.

The present example embodiment is different from the foregoing seventh example embodiment as follows. In the seventh example embodiment, the first paint loop 810 (see FIG. 18) and the second paint loop 820 (see FIG. 18) are synchronized to perform composition, and this means that time is delayed for the synchronization in the web engine 330 (see FIG. 6). This operation is generally performed by the CPU, and it takes relatively long time.

On the other hand, the present example embodiment describes that the textures 930 and 940 are respectively produced by the first paint loop 910 and the second paint loop 920 and then composed outside the web engine 330 (see FIG. 6). This operation is performed by not the CPU but the GPU, and it is more quickly performed than the operation of the CPU. As compared with the seventh example embodiment, the present example embodiment reduces the delay due to the synchronization in the web engine 330 (see FIG. 6) and operates more quickly.

Effects of the second example embodiment will be described below as compared with those of the first example embodiment.

Figure 20:
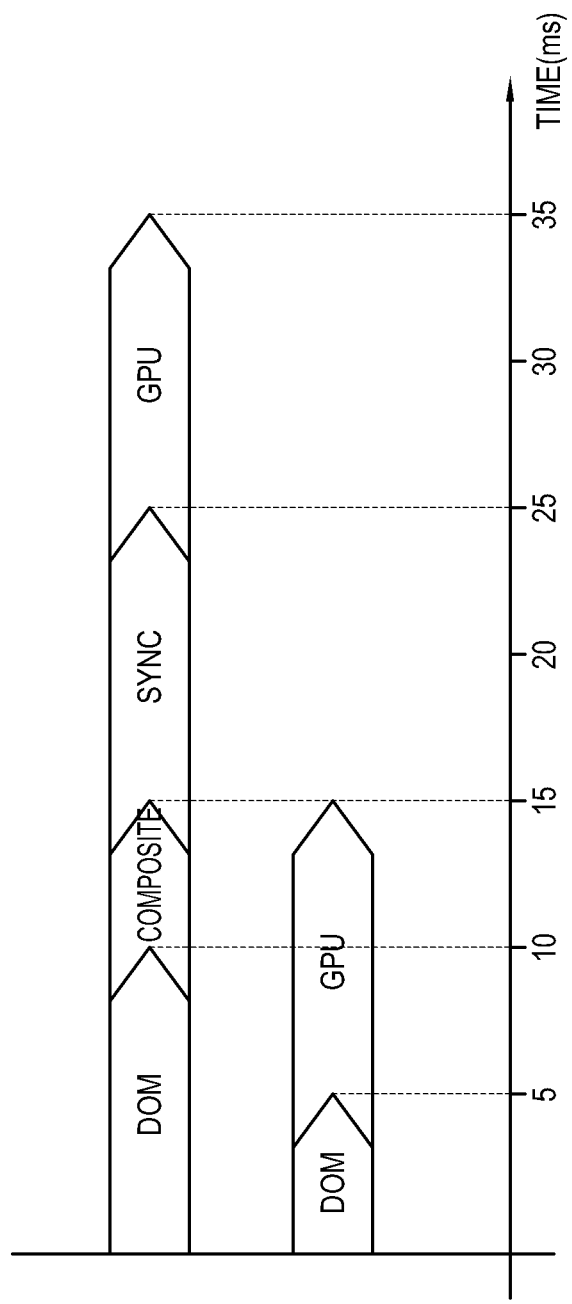
FIG. 20 is a graph illustrating an example comparison in use time between a first example embodiment and a second example embodiment.

FIG. 20 is a graph illustrating a comparison in use time between the first example embodiment and the second example embodiment. In FIG. 20, an upper graph is based on the first example embodiment, and a lower graph is based on the second example embodiment. These graphs are provided simply for comparison between the first example embodiment and the second example embodiment, and detailed descriptions about their experimental environments will be omitted.

As illustrated in FIG. 20, if a predetermined web page is processed by the first example embodiment, DOM tree parsing and build-up, composition, synchronization, and GPU process are performed in sequence. It took 10 ms to parse the DOM tree, it took 5 ms to perform the composition, it took 10 ms to perform the synchronization, and it took 10 ms to perform the GPU process.

On the other hand, if the same web page is processed by the second example embodiment, DOM tree parsing and build-up, and the GPU process are performed in sequence. It took 5 ms to parse the DOM tree, and it took 10 ms to perform the GPU process.

A more detailed explanation of the graphs is as follows.

The second example embodiment excludes composition and synchronization from those of the first example embodiment. In the second example embodiment, the render object tree is built up by excluding the object not using the WebGL when the DOM structure is parsed, and the render object tree includes only the object using the WebGL to be displayed as a full screen. That is, only one object to be displayed as the full screen is processed by the GPU, and therefore no object is subject to composition and synchronization.

Further, time taken to parse the DOM in the second example embodiment is about half that in the first embodiment, e.g., is relatively short. As described above, in the second example embodiment, the render object tree excludes the object not using the WebGL, and therefore time taken in the following operations for building up the render layer tree and the graphic layer tree is also shortened, thereby decreasing time of parsing and building up the whole tree.

The processing time of the GPU is equal between the first example embodiment and the second example embodiment since the size of screen displayed on the web view is not changed regardless of the number of objects.

Thus, it will be appreciated that the second example embodiment takes shorter time than the first example embodiment when the object using the WebGL is displayed as the full screen. Further, it is also possible to reduce the system load of the display apparatus 100 since the operations of the CPU and the GPU are decreased.

For example, if an object to be displayed as a full screen is a 3D web game, one frame has to be processed within 16 ms in order to secure 60 fps where a user can smoothly enjoy playing game. Since the second example embodiment can support 15 ms per frame, it is possible to support a web game requiring a process of higher fps.

Figure 21:
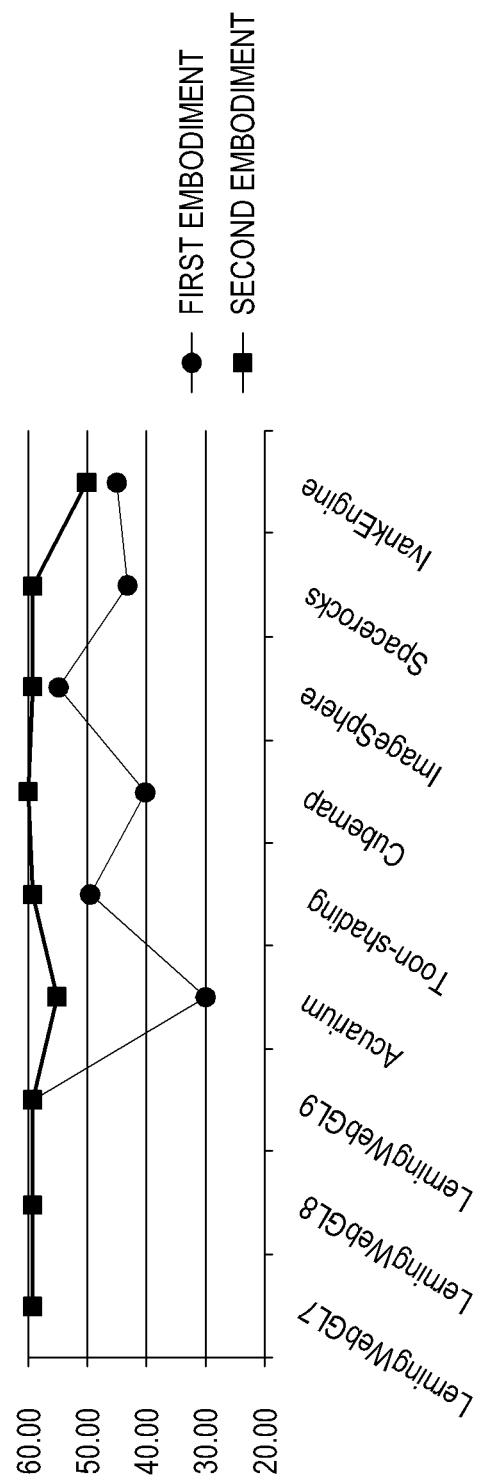
FIG. 21 is a graph illustrating example results from various preset tests related to WebGL according to the first example embodiment and the second example embodiment.

FIG. 21 is a graph illustrating results from various preset tests related to WebGL according to the first example embodiment and the second example embodiment.

As illustrated in FIG. 21, results for measuring how many times frames are drawn for 1 second during the rendering operation of the GPU with respect to many preset test cases for testing the WebGL are illustrated as graphs of the first and second example embodiments. In the graph, a vertical axis refers to fps, and a higher value indicates a more excellent result.

In a horizontal axis, LerningWebGL7, LerningWebGL8, LerningWebGL9, Acuarium, Toon-shading, Cubemap, ImageSphere, Spacerocks, and Ivank Engine refer to the test cases for testing the WebGL. Among them, LerningWebGL7, LerningWebGL8 and LerningWebGL9 include more 2D graphic elements than 3D graphic elements; and Acuarium and Cubemap include remarkably many 3D graphic elements.

The first example embodiment illustrates 60 fps or a similar fps value with respect to LerningWebGL7, LerningWebGL8, LerningWebGL9 and ImageSphere. However, the first example embodiment drops to about 40 fps with respect to Cubemap, Spacerocks and Ivank Engine where there are many 3D graphic elements. For example, the first example embodiment largely drops to 30 fps with respect to Acuarium.

This means that the first example embodiment may demonstrate deteriorated quality with respect to the web page or the web application having many 3D graphic elements.

On the other hand, the second example embodiment uniformly shows 50 fps or higher, i.e. 60 fps as necessary with respect to all the test cases. For example, the second example embodiment illustrates 55 fps or higher with respect to Acuarium and Cubemap at which the first example embodiment shows low values of fps. Thus, according to the second example embodiment, the value of fps is not remarkably dropped even with respect to many 3D graphic elements, and thus minimizes quality deterioration when it is applied to the web page or the web application having many 3D graphic elements.

Figure 22:
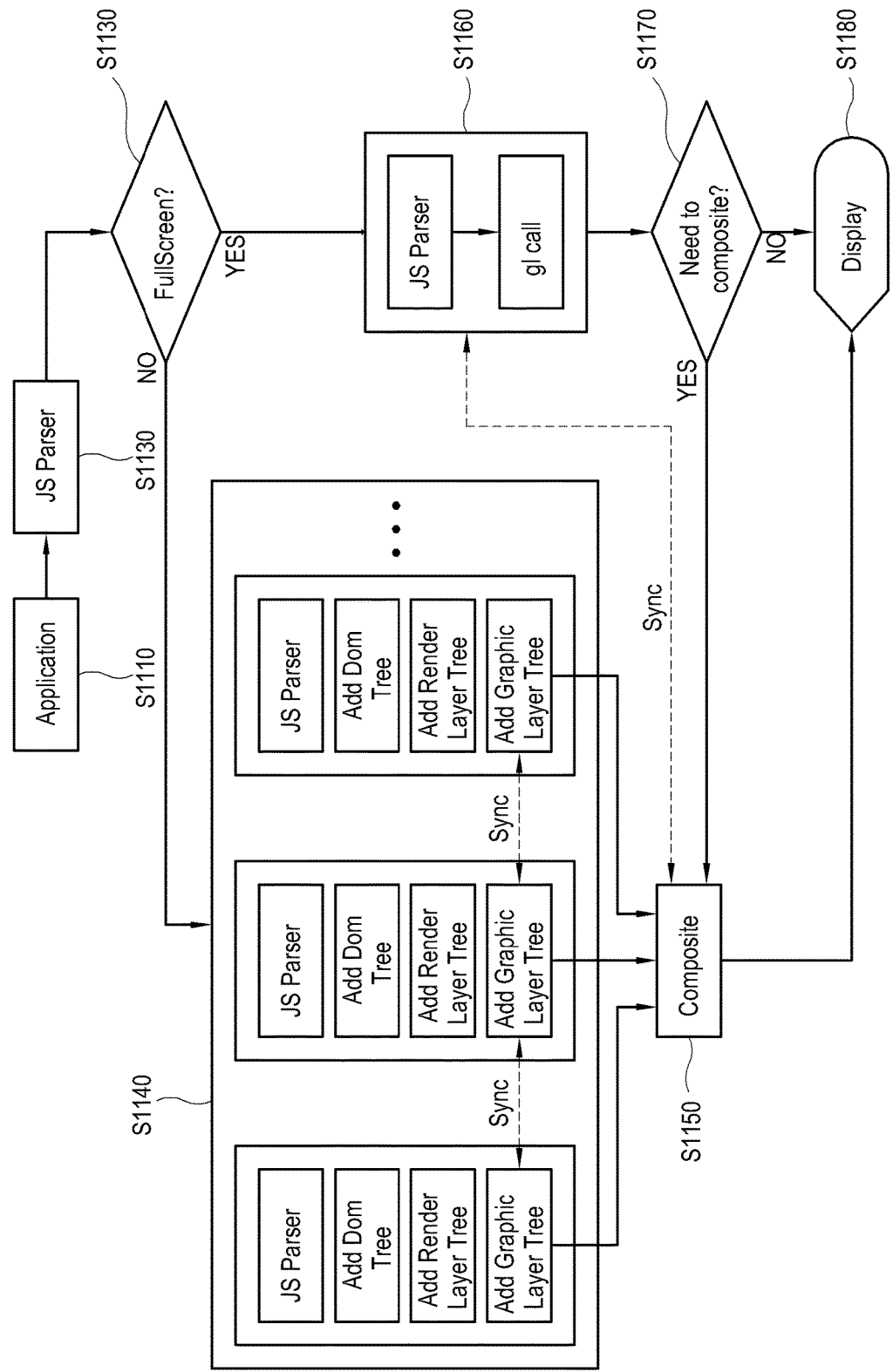
FIG. 22 is a flowchart illustrating an example method of displaying a web application in a display apparatus.

FIG. 22 is a flowchart illustrating an example method of displaying a web application in a display apparatus 100 according to a ninth example embodiment.

As illustrated in FIG. 22, at operation S1110 the display apparatus 100 receives a web application. At operation S1120, a JS Parser, e.g., a Java script engine, parses the web application.

At operation S1130, the display apparatus 100 determines whether there is an input for instructing an object using a WebGL to be displayed as a full screen among objects of a web application.

If there is no input for instruction about the full screen, at operation S1140 DOM rendering is performed. During the DOM rendering, operations of the JS Parser for parsing Java script, an Add DOM Tree for building up a DOM tree, an Add Render Layer Tree for building up the render layer tree, and an Add Graphic Layer Tree for building a graphic layer tree are performed in sequence with respect to respective objects. Further, synchronization is performed between the objects.

With this synchronization, at operation S1150 composition for composing the textures of the objects are performed. Then, at operation S1180, the display apparatus 100 displays a composite texture.

On the other hand, if there is an input for instruction about the full screen, at operation S1160 JS Parser parses Java script with respect to a corresponding object, and a GL call for calling a graphic library is performed, thereby producing the texture of the object.

At operation S1170 the display apparatus 100 determines whether there is a need of composing the corresponding texture with another texture. If it is determined that the composition is needed, the display apparatus 100 returns to the operation S1150 and performs the composition. On the other hand, if it is determined that the composition is not needed, at operation S1180 the display apparatus 100 displays the corresponding texture.

Figure 23:
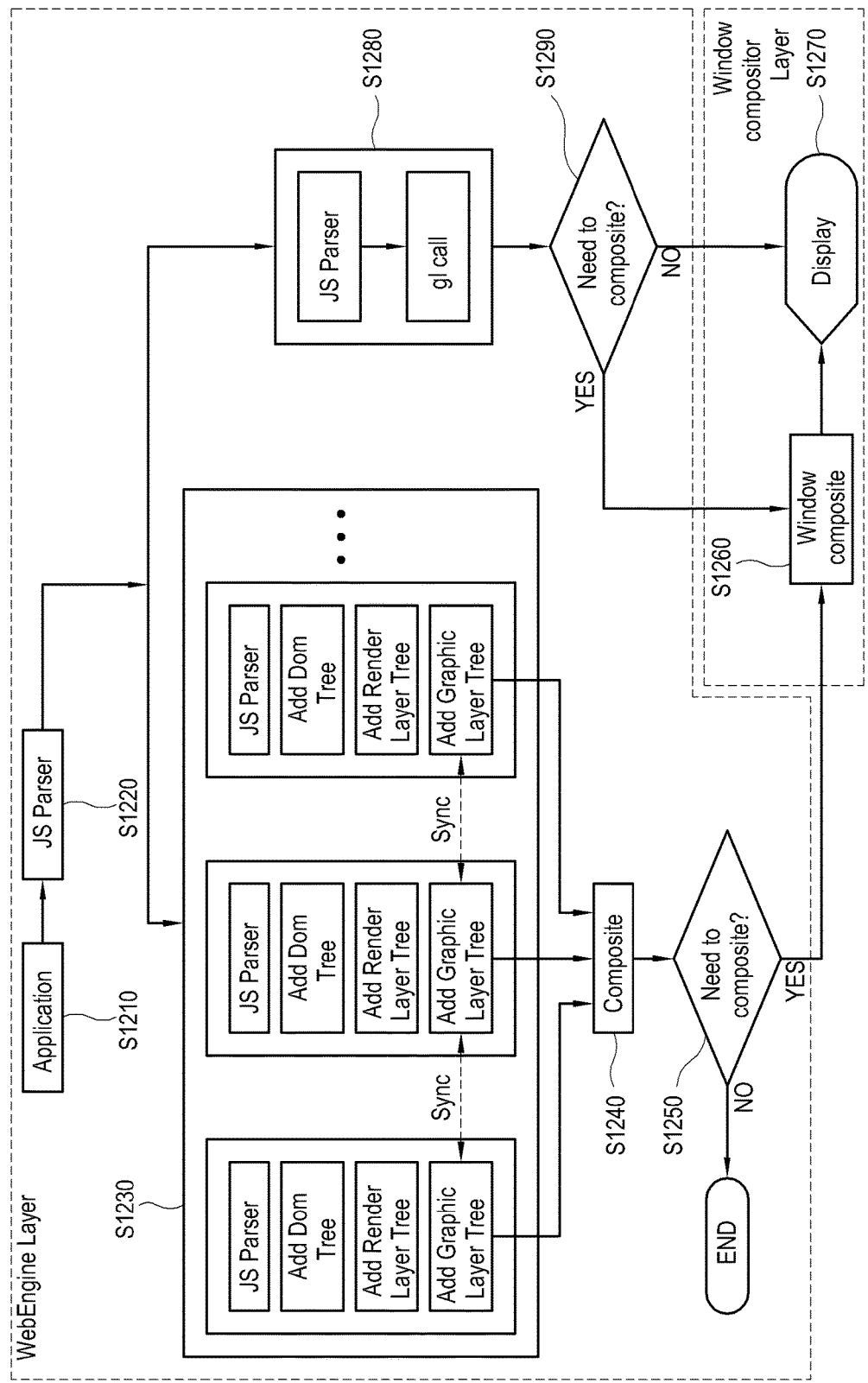
FIG. 23 is a flowchart illustrating an example method of displaying a web application in a display apparatus.

FIG. 23 is a flowchart illustrating an example method of displaying a web application in a display apparatus 100 according to a tenth example embodiment;

As illustrated in FIG. 23, operations according to this example embodiment may be included in one of a WebEngine layer implemented by a web engine and a Window Compositor layer implemented by a window manager.

At operation S1210 the display apparatus 100 receives a web application. At operation S1220 the JS Parser, e.g., the Java script engine, parses the web application.

Then, among the objects of the web application, an object to be subject to DOM rendering and an object to be subject to WebGL rendering are classified and then processed. The former is an object, which does not require a call of WebGL, different from the latter.

The DOM rendering is performed at operation S1230. During the DOM rendering, operations of the JS Parser for parsing Java script, an Add DOM Tree for building up a DOM tree, an Add Render Layer Tree for building up the render layer tree, and an Add Graphic Layer Tree for building a graphic layer tree are performed in sequence with respect to respective objects. Further, synchronization is performed between the objects, and at operation S1240 composition for composing the textures of the objects is performed.

At operation S1250 the display apparatus 100 determines whether to additionally compose the texture of WebGL rendering with regard to the composite texture in accordance with results of the DOM rendering.

If it is determined to do composition, the display apparatus 100 performs Window Composite for finally composing the textures at operation S1260, and displays it at operation S1270.

The WebGL rendering is performed at operation S1280. In the operation S1280, the JS Parser parses Java script with respect to the corresponding object, and a GL call is performed to call out a graphic library, thereby producing the texture of the object.

At operation S1290, the display apparatus 100 determines whether the corresponding texture needs to be composed together with another texture. If it is determined that the composition is needed, the display apparatus 100 returns to the operation S1260 and performs the composition. On the other hand, if it is determined that the composition is not needed, the display apparatus 100 returns to operation S1260 and displays the corresponding texture.

In the foregoing procedures, the operations S1260 to and S1270 are performed by not the WebEngine Layer but the Window Compositor Layer. In this example, improvement in performance is expected since synchronization is secured or other DOM texture windows are processed not to be composed. Further, DOM rendering may be also composed under the condition that high speed of rendering is not required.

Figure 24:
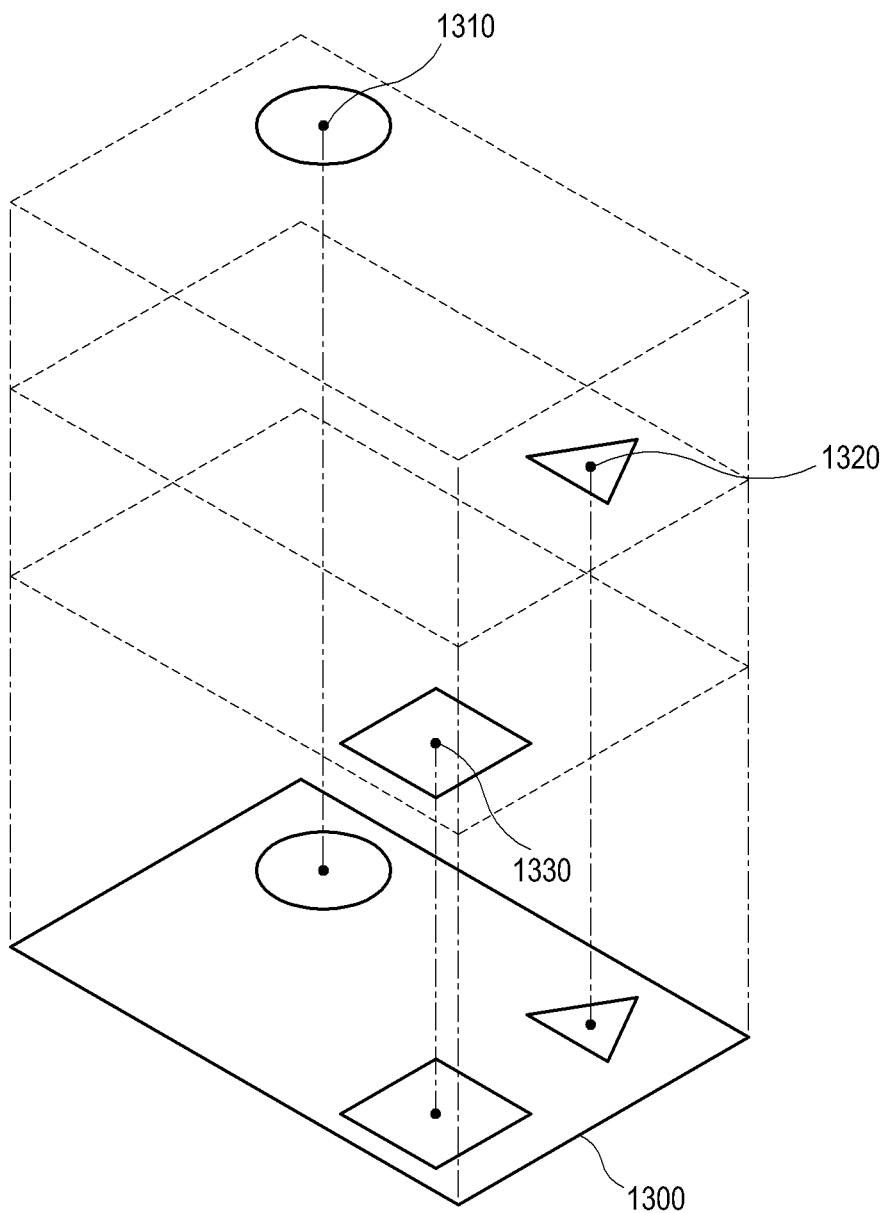
FIG. 24 is a diagram illustrating a principle of displaying a web-content image in a display apparatus.

FIG. 24 is a diagram illustrating a principle of displaying a web-content image 1300 in a display apparatus 100 according to an eleventh example embodiment.

As illustrated in FIG. 24, the display apparatus 100 receives web contents including a plurality of graphic layers 1310, 1320 and 1330. The display apparatus 100 renders the respective graphic layers 1310, 1320 and 1330 and loads them to the video memory (not shown). The web content has information of defining where the respective layers 1310, 1320 and 1330 will be arranged within an image 1300. Based on this information, the display apparatus 100 displays the web-content image 1300 by overlapping the respective graphic layers 1310, 1320 and 1330.

However, if there is a user's input for instructing a first layer 1310 to be displayed as a full screen among the plurality of graphic layers 1310, 1320 and 1330, the display apparatus 100 resizes the first layer 1310 to be displayed as the first layer 1310.

Figure 25:
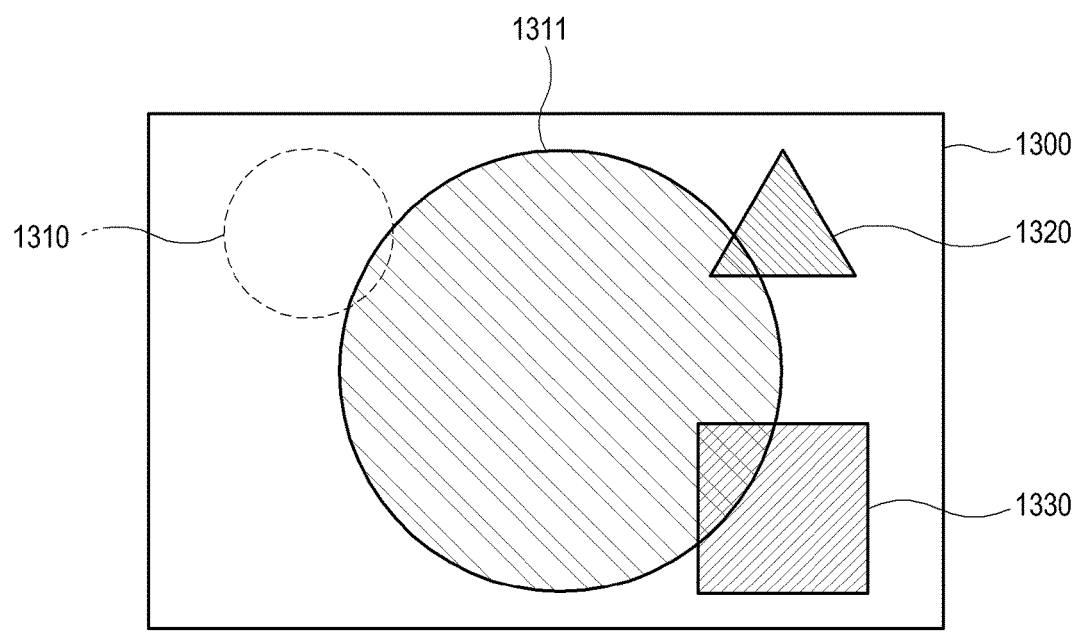
FIG. 25 is a diagram illustrating an example of when a first layer is enlarged in the web-content image of FIG. 24, other layers are covered with the enlarged first layer.

FIG. 25 is a diagram illustrating an example that when the first layer 1310 is enlarged in the web-content image 1300 of FIG. 24, the other layers 1320 and 1330 are covered with the enlarged first layer 1311.

As illustrated in FIG. 25, if the display apparatus 100 enlarges the first layer 1310 to display the full screen of the first layer 1311, the second layer 1320 and the third layer 1330 are covered with the first layer 1311 and disappear from the image 1300.

Thus, the display apparatus 100 prevents the second layer 1320 and the third layer 1330, which are covered with the first layer 1311 displayed as the full screen, from being loaded to the video memory (not shown). Therefore, only the first layer 1311 is loaded to the video memory (not shown), and the display apparatus 100 displays the first layer 1311 to be displayed as a full screen on the image 1300. Since the second layer 1320 and the third layer 1330 are not loaded to the video memory (not shown), the display apparatus 100 does not perform operations for the layers 1320 and 1330 not to be displayed.

According to this example embodiment, one layer 1311 is displayed as a full screen. Alternatively, the layer 1311 may be not displayed as the full screen. The layer 1310 may be enlarged to have a predetermined size instead of the full screen, which is enough to cover the other layers 1320 and 1330. If the first layer 1310 is enlarged to cover the second layer 1320 except the third layer 1330, the display apparatus 100 loads the first layer 1310 and the third layer 1330 to the video memory (not shown) but prevents the second layer 1320 from being loaded to the video memory (not shown).

The methods according to the foregoing example embodiments may be achieved in the form of a program command that can be implemented in various computers, and recorded in a computer readable medium. Such a computer readable medium may include a program command, a data file, a data structure or the like, or combination thereof. For example, the computer readable medium may be stored in a volatile or nonvolatile storage such as a read only memory (ROM) or the like, regardless of whether it is deletable or rewritable, for example, a RAM, a memory chip, a device or integrated circuit (IC) like memory, or an optically or magnetically recordable or machine (e.g., a computer)-readable storage medium, for example, a compact disk (CD), a digital versatile disk (DVD), a magnetic disk, a magnetic tape or the like. It will be appreciated that a memory, which can be included in a mobile terminal, is an example of the machine-readable storage medium suitable for storing a program having instructions for materializing the example embodiments. The program command recorded in this storage medium may be specially designed and configured according to the example embodiments, or may be publicly known and available to those skilled in the art of computer software.

Although various example embodiments have been illustrated and described, it will be appreciated by those skilled in the art that changes may be made in these example embodiments without departing from the principles and spirit of the disclosure, the scope of which is defined in the appended claims and their equivalents.

What is claimed is:

1. A display apparatus comprising:
   a display;
   communication circuitry configured to communicate with a content source;
   a memory; and
   a processor configured to process:
      to receive a web-based content comprising a first object and a second object through the communication circuitry;
      in response to determining that the first object is disposed to cover the second object in a content image to be displayed, to determine whether the first object needs to call out a first preset application programming interface (API);
      in response to determining that the first object does not need to call out the first preset API, to load data of the first object and the second object in the memory;
      in response to determining that the first object needs to call out the first preset API, to load data of the first object, but not the second object, in the memory; and
      to display the content image on the display based on the data loaded in the memory.

2. The display apparatus according to claim 1, wherein the processor is configured to process to determine whether the first object is subject to a 3D graphic process in response to an instruction for covering the second object with the first object, and to process the first object to be resized and displayed based on the instruction based on determining that the first object is subject to the 3D graphic process.

3. The display apparatus according to claim 2, wherein the processor is configured to process to determine that the first object is subject to the 3D graphic process based on the first object being processed by calling out a second preset application programming interface (API) when the first object is loaded in the memory.

4. The display apparatus according to claim 3, wherein the second preset API comprises a web graphic library (WebGL).

5. The display apparatus according to claim 2, wherein the processor comprises:
   a central processing unit (CPU) configured to extract the first and second objects from the web-based content; and
   a graphic processing unit (GPU) configured to process an object of the first and second objects extracted by the CPU that is subject to a 3D graphic process.

6. The display apparatus according to claim 5, wherein the GPU is configured to load the memory with textures obtained by rendering the first object transferred from the CPU, to compose a plurality of textures based on the textures being loaded in the memory, and to process one texture as the content image without composition based on one texture being loaded in the memory.

7. The display apparatus according to claim 1, wherein in response to determining that the first object is disposed to cover the second object, the first object is displayed on a whole display area preset to display the content image in the display.

8. The display apparatus according to claim 1, wherein the web-based content comprises a web page.

9. A display apparatus comprising:
   a display;
   communication circuitry configured to communicate with a content source and receive web content comprising a first object and a second object;
   a memory; and
   a processor configured to:
      display a content image on the display based on data loaded in the memory;
      receive an instruction for the first object to cover the second object in the content image;
      identify whether the first object is to be processed by a GPU (graphic processing unit);
      load data of the first object and data of the second object in the memory based on identifying that the first object is not to be processed by the GPU; and
      load data of the first object, but not data of the second object, in the memory based on identifying that the first object is to be processed by the GPU.

10. The display apparatus according to claim 9, wherein the web content comprises a web page.

11. A method of controlling a display apparatus, the method comprising:
   receiving a web-based content comprising a first object and a second object;
   in response to determining that the first object is disposed to cover the second object in a content image to be displayed, determining whether the first object needs to call out a first preset application programming interface (API);
   in response to determining that the first object does not need to call out the first preset API, loading data of the first object and the second object in a memory;
   in response to determining that the first object needs to call out the first preset API, loading data of the first object, but not the second object, in the memory; and
   displaying the content image on a display based on the data loaded in the memory.

12. The method according to claim 11, further comprising:
   determining whether the first object is subject to a 3D graphic process in response to an instruction for covering the second object with the first object; and processing the first object to be resized and displayed based on the instruction based on determining that the first object is subject to the 3D graphic process.

13. The method according to claim 12, wherein the first object is determined to be subject to the 3D graphic process based on the first object being processed by calling out a second preset API when the first object is loaded in the memory.

14. The method according to claim 13, wherein the second preset API comprises a WebGL.

15. The method according to claim 11, wherein, in response to determining that the first object is disposed to cover the second object, the first object is displayed on a whole display area preset to display the content image in the display.

16. The method according to claim 11, wherein the web-based content comprises a web page.

* * * * *